(12) United States Patent
Sekine et al.

(10) Patent No.: US 6,477,885 B1
(45) Date of Patent: *Nov. 12, 2002

(54) LUBRICANT APPLYING SYSTEM FOR A ROLLING BEARING

(75) Inventors: Masaaki Sekine, Kanagawa (JP); Katsuyoshi Yamashita, Kanagawa (JP); Michiharu Naka, Kanagawa (JP)

(73) Assignee: NSK Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/471,232

(22) Filed: Dec. 23, 1999

(30) Foreign Application Priority Data

Dec. 25, 1998 (JP) .............................. 10-370097
Jun. 8, 1999 (JP) .............................. 11-161260

(51) Int. Cl.[7] .......................... G07N 21/00; G07N 3/56; F01M 11/12
(52) U.S. Cl. .......................... 73/10; 73/865.8; 184/6.4; 184/7.4; 356/237.1
(58) Field of Search .................... 73/10, 865.8; 184/6.4, 184/7.4; 356/237.1; 340/631

(56) References Cited

U.S. PATENT DOCUMENTS

| 4,152,598 A | * | 5/1979 | Stewart | ....................... 250/391 |
| 4,738,336 A | * | 4/1988 | Smith et al. | .................. 184/6.4 |
| 5,076,397 A | * | 12/1991 | Yamada | ....................... 184/6.4 |
| 6,324,899 B1 | * | 12/2001 | Discenzo | .................... 73/53.05 |

FOREIGN PATENT DOCUMENTS

| JP | 106196 | * | 5/1987 | .................. 184/6.4 |
| JP | 64-46011 | | 2/1989 | ........... F16C/19/04 |
| JP | 5-149343 | | 6/1993 | ........... F16C/36/66 |
| JP | 8-303467 | | 11/1996 | ........... F16C/33/44 |
| RU | 3943191 | * | 12/1986 | |

* cited by examiner

Primary Examiner—Hezron Williams
Assistant Examiner—Michael Cygan
(74) Attorney, Agent, or Firm—Sughrue Mion, PLLC

(57) ABSTRACT

In a lubricant application system, a prescribed volume of lubricant is transferred from a lubricant discharge port 8 of a prescribed liquid volume discharge device to a rolling element 703 of a rolling bearing 700 in a state in which the lubricant discharge port 8 is positioned directly above and sufficiently close to the rolling element 703, whereby the lubricant is applied to the interior of the rolling bearing 700. Further, the application system inspects whether or not a prescribed volume of lubricant is injected from the discharge device for injecting a lubricant into the interior of a rolling bearing 700. A laser beam $L_1$ is irradiated between a lubricant discharge port 8 of the lubricant discharge device and the rolling bearing 700, and a reflected laser beam $L_2$ reflected by the lubricant when it is discharged from the lubricant discharge port 8 is received by a photoreceptor 116 disposed on the optical axis of the reflected laser beam $L_2$, whereby whether or not the lubricant is applied to the rolling bearing 700 is determined based on an output from the photoreceptor 116.

10 Claims, 14 Drawing Sheets

LUBRICANT APPLYING SYSTEM FOR A ROLLING BEARING

BACKGROUND OF THE INVENTION

1. Field of the Invention

The present invention relates to a lubricant applying system for a rolling bearing, in particular, an apparatus for applying a lubricant to the interior of a rolling bearing, and an apparatus for inspecting a lubricant applied condition of a rolling bearing adapted to inspect whether or not a lubricant is applied to the interior of the rolling bearing.

2. Description of the Related Art

FIG. 15 shows the construction-of a rolling bearing. In the figure, reference numeral 700 denotes a rolling bearing, which is constituted by an outer race 701, an inner race 702 and a crown-shaped retainer 704 provided between the races for retaining a plurality of ball-like rolling elements 703.

Known as a conventional method for applying a lubricant to the interior of thus rolling bearing 700 is describes an oil plating method for slightly applying a lubricant on a bearing raceway surface (Japanese Patent Unexamined Publication No. SHO 64-46011), a method including the steps of dipping the assembled rolling bearing 700 in a lubricant, picking up the rolling bearing 700 from the lubricant and removing the lubricant therefrom in a centrifugal fashion (Japanese Patent Unexamined Publication No. HEI 8-303467), or a method including the steps of dipping the rolling bearing 700 in a lubricant diluted with a solvent (petroleum benzine) and thereafter allowing the solvent to evaporate (Japanese Patent Unexamined Publication No. HEI 5-149343).

Widely adopted as a means for assembling the rolling bearing 700 to an apparatus is a method for adhering a radially inner surface of the inner race 702 to a shaft or for adhering a radially outer surface of the outer race 701 to a housing. In these methods, the adhering surfaces of the rolling bearing 700 are required to be dry (hereinafter, described as a first case).

In addition, in an apparatus such as a hard disk drive in which a high degree of cleanness is required in the interior thereof, the volume of lubricant component running out of or flying from the rolling bearing-700-needs to be as little as possible. This requires a flat portion as well as the radially inner and outer surface portions of the rolling bearing 700 to be sufficiently dry. Moreover, if there is some lubricant adhering to a sealing groove portion formed in the outer race 701 and the inner race 702, this adhering lubricant runs out of the sealing groove portion when a seal is inserted thereinto, and therefore this sealing groove portion also needs to be sufficiently dry (hereinafter, described as a second case).

Furthermore, a fiber constituent contained in grease as a lubricant is not too good to reduce and stabilize the torque of the rolling bearing, and therefore there are some rolling bearings 700 in which grease is required to be put on the retainer 704 in order to reduce and stabilize the torque thereof. In this case, when some of the lubricant required for lubrication in an initial stage (oil component in the grease runs out thereof soon after the initial stage and this oil component contributes to the lubrication of the rolling bearing) adheres to the portion where grease is put, the grease becomes easy to slide down over the retainer 704, and it moves and comes to adhere to rolling element raceway surfaces of the outer and inner races 701, 702 while the rolling bearing 700 is rotating. Therefore, the torque is increased and caused to vary. In order to prevent this, no lubricant has to adhere to the portion of the retainer 704 where grease is put (hereinafter, described as a third case).

In addition, there is a case where any combination out of the above three cases simultaneously constitutes a problem. In other words, a problem is caused by a combination of the first and second cases, the first and third cases, or the second and third cases. Moreover, there is a case where the first, second and third cases simultaneously constitute a problem.

Namely, it is important that no lubricant adheres to any portion in the interior of the rolling bearing 700 that does not really needs lubrication. What needs lubrication in the interior of the rolling bearing 700 are the rolling element raceway surfaces of the outer and inner races 701, 702 and the surface of the rolling elements 703.

In the aforesaid conventional example, however, it is not possible to apply a lubricant only to portions in the interior of the rolling bearing 700 which need lubrication and it is unavoidable that a relatively large volume of oil component adheres to portions in the interior of the rolling bearing 700 other than those that really need lubrication. In addition, in the above-described conventional example, it is very difficult to dry only the exterior of the rolling bearing 700 with a needed volume of lubricant being left in the interior thereof. Moreover, manual removal of oil component adhering to the exterior of the rolling bearing 700 causes an increase in costs.

Moreover, it becomes important to inspect whether or not a lubricant is injected into the interior of a rolling bearing through a total inspection for judgement of defective or non-defective. However, in the methods described in the aforesaid publications, only the process of applying the lubricant is described and none of the methods describes therein a process of inspecting a lubricant-applied condition of the rolling bearing after the lubricant is applied thereto. Thus, there is caused a problem that whether or not the lubricant is properly applied to the completed rolling bearing is unclear.

SUMMARY OF THE INVENTION

The present invention was made in view of the aforesaid problems inherent in the related art, and an object thereof is to provide a system for easily and securely applying a lubricant only to portions in the interior of a rolling bearing which really need lubrication and further for inspecting the lubricant applied condition of the rolling bearing by optical detection.

With a view to attaining the above object, according to a first aspect of the present invention, there is provided a method for applying a lubricant to a rolling bearing by using a prescribed liquid volume discharge device comprising at least one discharge port, the method including the steps of placing the discharge port directly above and sufficiently close to a rolling element of the rolling bearing, and transferring a prescribed volume of the lubricant from the discharge port to the rolling element for application of the lubricant to the interior of the rolling bearing.

Further, according to a second aspect of the present invention, there is provided a method and apparatus for inspecting a lubricant applied condition of a rolling bearing adapted to inspect whether or not a prescribed volume of lubricant is discharged from a lubricant discharge device for injecting a lubricant in the interior of a rolling bearing. A laser beam is irradiated between a discharge port of the lubricant discharge device and the rolling bearing, and a reflected laser beam reflected by a lubricant when the lubricant is discharged from the discharge port is received by a photoreceptor device disposed on an optical axis of the reflected laser beam, whereby whether or not the lubricant is applied to the rolling bearing is inspected based on an output from the photoreceptor device.

In the method and apparatus for inspecting a lubricant applied condition of a rolling bearing, when the lubricant is injected into the interior of the rolling bearing from the discharge port of the lubricant discharge device, for instance, while a ball of the rolling bearing is caused to approach to a distal end of the discharge port and then the lubricant is discharged, the laser beam is irradiated between the discharge port and the rolling bearing, and the reflected laser beam reflected by the lubricant is received by the photoreceptor device. Since the photoreceptor device is disposed on the optical axis of the reflected laser beam, in a case where a prescribed volume of the lubricant is not discharged, the reflected laser beam is reflected in a different direction or there is reflected no laser beam, whereby the photoreceptor device receives no light. Thus, the output varies depending on whether or not there is reflected a laser beam, and therefore whether or not the prescribed volume of lubricant is discharged can be judged based on the output from the photoreceptor device, whereby the lubricant applied condition of the rolling bearing can be inspected.

Raised as a specific inspection device for carrying out the above method for inspecting a lubricant applied condition of a rolling bearing according to the present invention is an inspection device for inspecting a lubricant applied condition of a rolling bearing which comprises a discharge device for injecting a prescribed volume of lubricant into the interior of the rolling bearing, a laser beam projector for irradiating a laser beam between a discharge port of the discharge device and the rolling bearing, and a photoreceptor disposed on an optical axis of a reflected laser beam produced when the laser beam from the laser beam projector is reflected by the lubricant for receiving the reflected laser beam, whereby whether or not the lubricant is applied to the rolling bearing is inspected based on an output from the laser beam receptor.

In this device for inspecting a lubricant applied condition of a rolling bearing, when the prescribed volume of lubricant is injected into the interior of the rolling bearing by the discharge device, the laser beam is irradiated between the discharge port of the discharge device and the rolling bearing by the laser beam projector, and the reflected laser beam produced when the laser beam from the laser beam projector is reflected by the lubricant is then received by the laser beam receptor. In other words, in a case where the prescribed volume of lubricant is discharged, the reflected laser beam from the lubricant is detected, while in a case where the prescribed volume of lubricant is not discharged, the reflected laser beam is oriented in a different direction, there-being no reflected laser beam that can be detected by-the photoreceptor.

In addition, since the reflected laser beam enters the laser beam photoreceptor only when the lubricant is discharged from the discharge device, after the completion of discharge there is no reflected laser beam that can detected by the laser beam photoreceptor. Thus, the output of the laser beam photoreceptor only exhibits a large momentary variation in level thereof. Since a momentary variation in output level like that has to be detected with high sensitivity, it is desirable to interpose a peak hold circuit to thereby securely detect the output of the photoreceptor that is to vary when the reflected laser beam is received by the photoreceptor.

Furthermore, the discharge of the lubricant from the discharge device into the interior of the rolling bearing and inspection of a lubricant applied condition may be carried out sequentially for individual balls or at one time for the respective balls. In a case where the discharge or inspection is carried out at one time for the respective balls, a representative inspection of a lubricant applied condition may be carried out only for one ball, this helping simplify the inspection.

Although the laser beam projector and laser beam photoreceptor may be disposed separately in order to increase the degree of freedom of design, they may be integrated into one construction in order to simplify operations of assembling and regulating of the inspection device.

Furthermore, the following are raised as other methods and apparatus for inspecting a lubricant applied condition of a rolling bearing.

Namely, there are provided a method and apparatus for inspecting a lubricant applied condition of a rolling bearing adapted to inspect whether or not a prescribed volume of lubricant is discharged from a lubricant discharge device for injecting a lubricant into the interior of the rolling bearing, wherein a substance is added to the lubricant which emits fluorescence when excited with an ultraviolet ray, wherein an ultraviolet ray is irradiated to the rolling bearing while cutting off external light, wherein an image of the rolling bearing to which the ultraviolet ray is so irradiated is picked up and wherein a lubricant applied condition is inspected based on the existence of fluorescence reflected in the picked-up image.

In this method and apparatus for inspecting a lubricant applied condition of a roller bearing, since the lubricant applied surface emits fluorescence when the prescribed volume of lubricant is discharged and applied to the rolling bearing, it is possible to quickly inspect the lubricant applied condition of the rolling bearing by detecting the fluorescence so emitted.

As an additive emitting the aforesaid fluorescence, for instance, an antioxidant of amine system may be used which does not damage the lubricating properties of the lubricant used.

Provided as a specific inspection device for carrying out the above method for inspecting a lubricant applied condition of a rolling bearing according to the present invention is an inspection device for inspecting a lubricant applied condition of a rolling bearing which is adapted-to inspect whether or not a prescribed volume of lubricant having added therein a substance adapted to emit fluorescence when excited with an ultraviolet ray is discharged from a lubricant discharge device for injecting the lubricant into the interior of the rolling bearing and comprises a light cut-off hood for cutting off external light so that the rolling bearing to be inspected is not exposed to the external light, a black light provided inside the light cut-off hood for irradiating an ultraviolet ray to the rolling bearing and a video camera for picking up an image of the rolling bearing irradiated with the ultraviolet ray by the black light, whereby the lubricant applied condition is inspected based on the existence of fluorescence reflected in the image picked up by the video camera.

In this inspecting device, in a case where the prescribed volume of lubricant is applied to the rolling bearing, the fluorescence is reflected over a predetermined area in the picked up image when an image of the rolling bearing irradiated with the ultraviolet ray by the black light is picked up by the video camera, while in a case where the prescribed volume of the lubricant is not applied to the rolling bearing, an area reflecting the fluorescence is less than the predetermined area, or there is no fluorescence reflected in the picked up image. Thus, whether or not the prescribed volume of the lubricant is discharged from the lubricant discharge device is inspected based on the fluorescence reflecting area.

DETAILED DESCRIPTION OF THE PREFERRED EMBODIMENTS

Respective embodiments of the present invention will be described with reference to FIGS. 1 to 14. In addition, a rolling bearing 700 having the construction shown in FIG. 15 is used in respective embodiments for explanation of a rolling bearing to which a lubricant is to be applied.

First Embodiment

First, referring to FIGS. 1 to 4, a first embodiment of operation of the present invention will be described.

Figure 1:
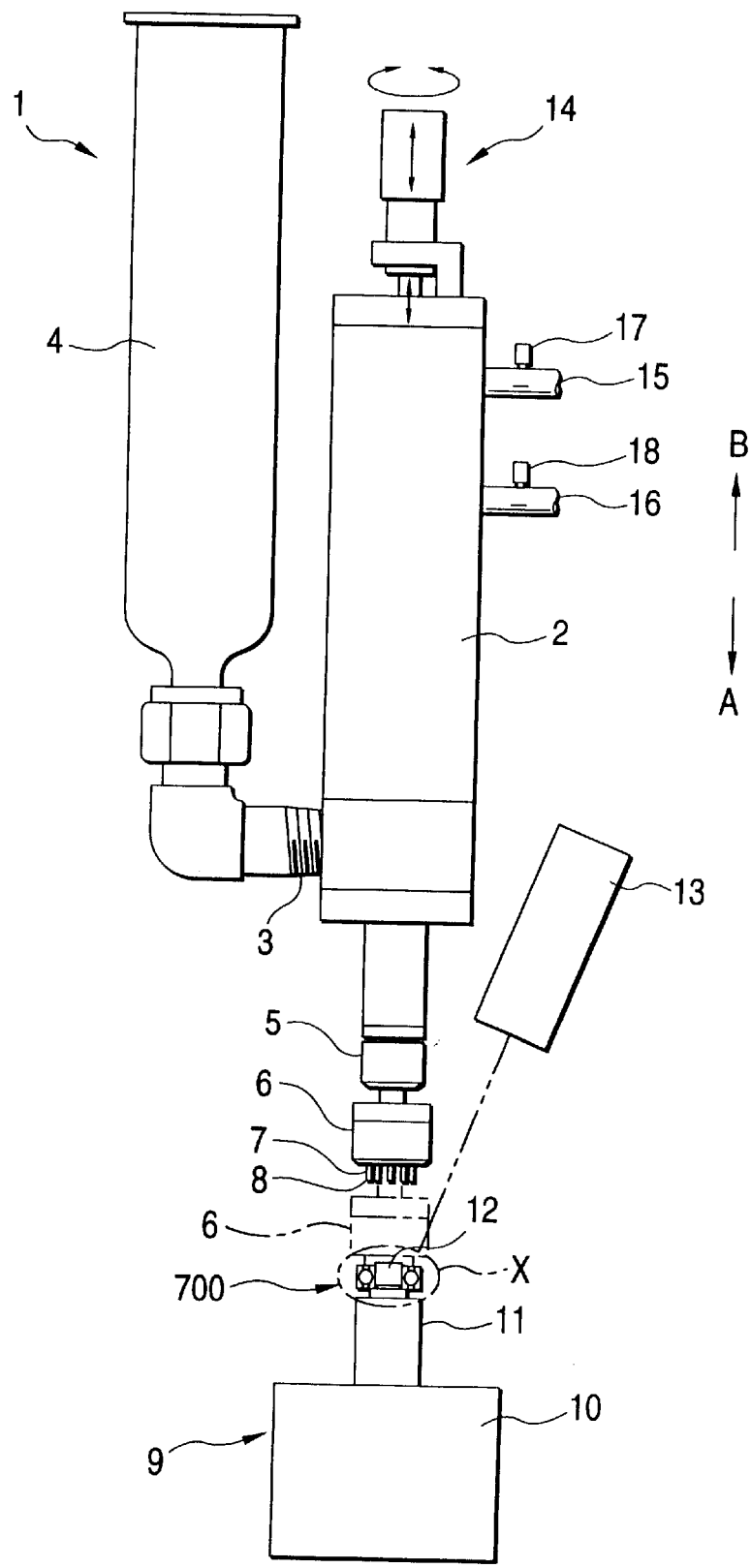
FIG. 1 is a side view showing the construction of a lubricant applying apparatus for use in carrying out a lubricant application method according to a first embodiment of the present invention.
Figure 2:
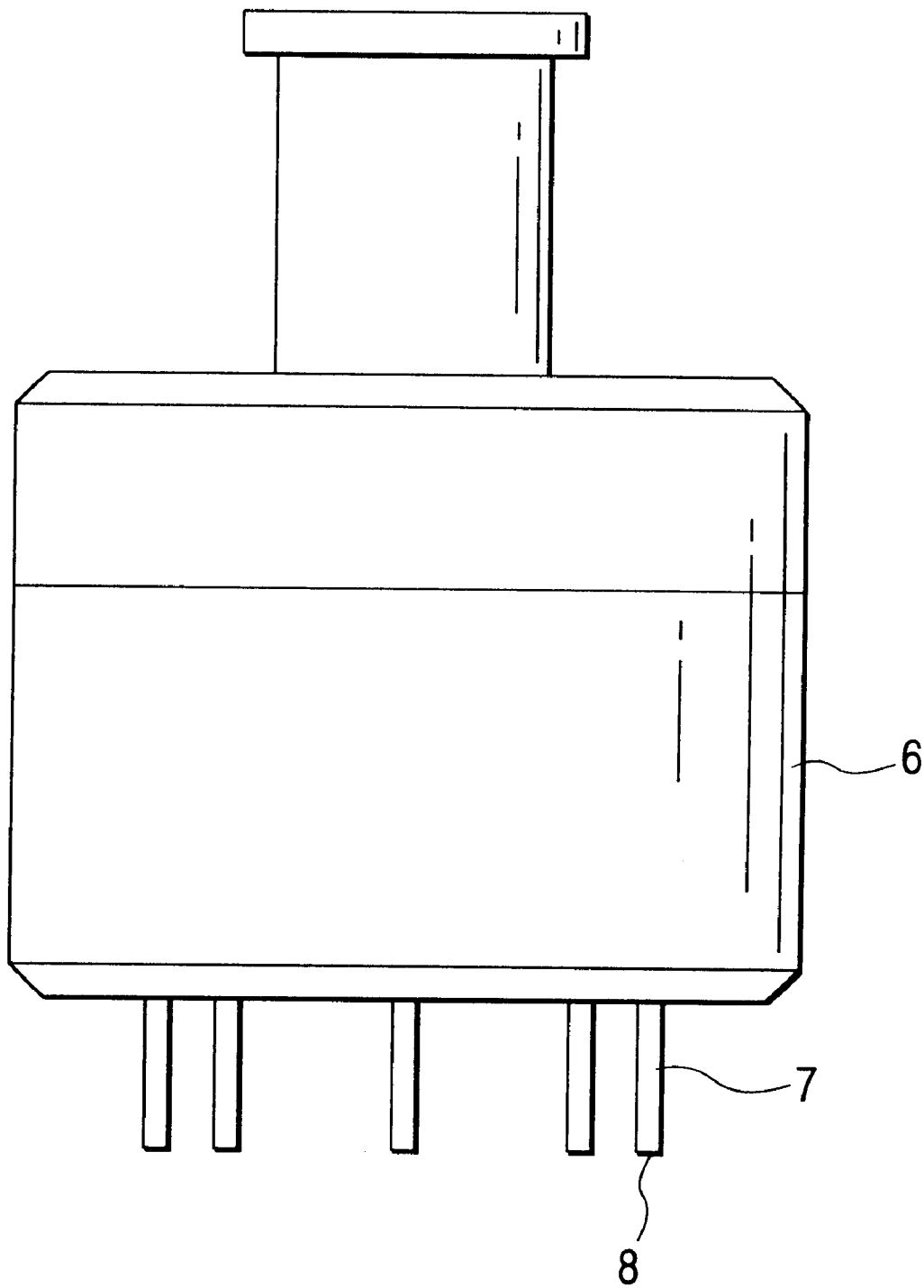
FIG. 2 is a side view showing the construction of a oil feed nozzle portion of the lubricant applying apparatus according to the first embodiment.

In FIG. 1, reference numeral 1 denotes a prescribed liquid volume discharge device, which has a plunger pump main body 2. A lubricant tank 4 is attached to a liquid suction port 3 connected to a side portion of a distal end (a lower end in FIG. 1) of the plunger pump main body 2. In addition, an oil feed nozzle 6 is attached to a nozzle connecting port 5 provided so as to protrude from a distal end face (a lower end face in FIG. 1) of the plunger pump main body 2. As shown in FIG. 2, a plurality of oil feed pipes 7 are attached to a distal end face (a lower end face in FIG. 1) of the oil feed nozzle 6 in such a manner as to correspond to the arrangement of rolling elements 703 of the rolling bearing 700. An oil repellent treatment is carried out on radially outer surfaces of the oil feed pipes 7 for preventing lubricant from adhering thereto. If lubricant adheres to the radially outer surface of the oil feed pipe 7, there may be caused a case where the lubricant so adhered then adheres to a flat portion or a sealing groove of the rolling bearing 700 or where the amount of lubricant to be applied becomes unstable. The oil repellent treatment can prevent the A distal end of the oil feed pipe 7 constitutes a lubricant discharge port 8. The diameter of a circle (pitch circle) passing between the respective lubricant discharge ports 8 substantially equals to the pitch diameter of the rolling elements 703 of the rolling bearing 700, and circumferential angular intervals each of the lubricant discharge ports and the rolling elements 703 are also-set to become similar to each other. The lubricant discharge port 8 is designed to discharge a prescribed volume of lubricant every time. The number of lubricant discharge ports 8 is determined depending on the discharge volume and viscosity of a lubricant used or the like.

The rolling bearing 700 is set above a rotating device (rotary driving section) 9. The rotating device 9 is designed to rotate the rolling bearing 700 around an axial center thereof relative to the lubricant discharge ports 8. The rotating device 9 includes a base table 10 and a rotating table 11 rotatably provided on the base table 10. A holding portion 12 is provided on the rotating table 11, and the rolling bearing 700 is detachably held at the holding portion 12.

In a state in which the rolling bearing 700 is held at the holding portion 12 of the rotating table 11, the central axes of the rolling bearing 700 and the rotating table 11 are coincident with each other, and these axes are coincident with the central axis (pitch circle center) of the arranged oil feed pipes 7.

The prescribed liquid volume discharge device 1 is set on a vertically slidable table (not shown), so that the discharge device 1 can be moved within a predetermined range in directions in which the lubricant discharge port 8 comes close to and goes away from the rolling bearing 700 held at the holding portion 12 of the rotating table 11 (shown in arrows A and B of FIG. 1).

Reference numeral 13 denotes a sensor for detecting the rotating elements 703 of the rolling device 700. The sensor 13 is set and fixed at a position where it can detect the rolling elements 703 of the rolling bearing 700 while the rolling bearing 700 is being rotated on the rotating table 11.

A relative position of the arrangement phase between the sensor 13 and the oil feed pipes 7 is set such that the sensor 13 is positioned directly below the rolling element 703 when the sensor 13 detects the rolling element 703. The rotating table 11 of the rotating device 9 is controlled such that it stops when the sensor 13 detects the rotating element 703.

When the sensor 13 detects the rolling element 703 of the rolling bearing 700, the lubricant discharge port 8 is located directly above the rolling elements 703 by a phase regulation unit, which will be described later, based on the results of the detection to thereby be positioned relative to each other. Thus, automatic positioning of the lubricant discharge port 8 can be effected.

In this connection, as to the method for positioning the rolling elements 703 of the roller bearing 700, the outer race 701 may be fixed with a fixture (not shown) and the inner race 702 may be rotated so that any of the rolling elements 703 is moved to be positioned directly below the oil feed pipes 7, or the inner race 702 may be fixed, while the outer race 701 may be rotated. Moreover, a method may be used in which the entirety of the fixture is rotated together with the bearing. In addition, a method may also be used in which the oil feed pipes 7 are moved.

A discharge volume regulating mechanism 14 is provided on on a proximal end face (an upper end face in FIG. 1) of the plunger pump main body 2. The discharge volume regulating mechanism 14 is intended to regulate the discharge volume of lubricant from the lubricant discharge port 8. In addition, air supply pipes 15, 16 for a plunger driving pneumatic cylinder are attached to a portion of the proximal end side of the plunger pump main body 2. When the air supply pipe 15 is pressurized, lubricant is discharged from the lubricant discharge port 8, while the air supply pipe 16 is pressurized, lubricant in the lubricant tank 4 is sucked into the plunger pump from the liquid suction port 3. A suction speed regulating knob 17 and a discharge speed regulating knob 18 are attached, respectively, to the air supply pipe 15 on the discharge side and the air supply pipe 16 on the suction side.

Figure 3:
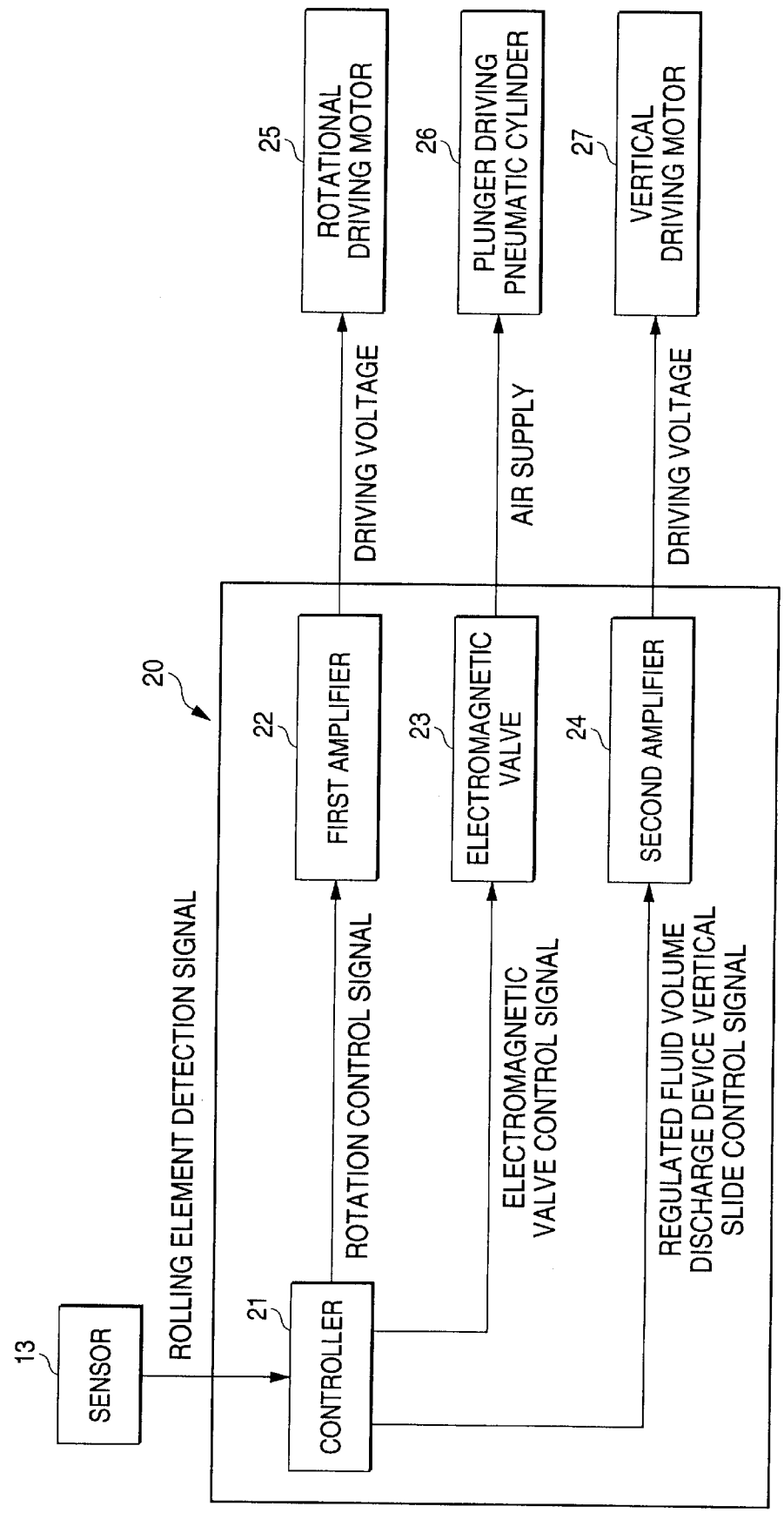
FIG. 3 is a block diagram showing the system construction of a control section of the lubricant applying apparatus according to the first embodiment.

FIG. 3 is a block diagram showing the construction of a control section. In the figure, reference numeral 20 denotes the control section for controlling operations of the aforesaid constituent components such that the rotating device 9, which is the rotary driving section, rotates the rolling bearing 700 relative to the lubricant discharge ports 8 and stops it at a position where the lubricant discharge ports 8 are located directly above the rolling bearing 700 based on a rolling element detection signal from the sensor 13, and that the prescribed liquid volume discharge device 1 applies a lubricant to the interior of the rolling bearing 700.

The control section 20 has a controller 21, a first amplifier 22, an electromagnetic valve 23 and a second amplifier 24. A rolling element detection signal is inputted in the controller 21 which is outputted from the sensor 13 when it detects that the rolling element 703 comes to a predetermined phase (an angular phase about the axial center). In addition, outputted from the controller 21 are a rotation control signal, an electromagnetic valve control signal and a vertical slide control signal for the prescribed liquid volume discharge device 1. The rotation control signal is inputted in the first amplifier 22, the electromagnetic valve control signal in the electromagnetic valve 23 and the prescribed liquid volume discharge device vertical slide control signal in the second amplifier 24.

The first amplifier 22 is connected to a rotational driving motor 25 for rotationally driving the rotating table 11. A driving voltage signal outputted from the first amplifier 22 is inputted in the rotational driving motor 25, whereby the rotational rotating motor 25 is rotationally controlled. In controlling the rotational driving of the rotating table 11, the sensor 13 is positioned in advance such that a switch, not shown, for the sensor 13 is switched on (ON) when the phase of the rolling element 703 coincides with that of the lubricant discharge port 8 (or they are put in a phase relation at a predetermined angle). The rotational driving motor 25 is to be equipped with an encoder so that a feedback control may be carried out or an open-loop control may be carried out by means of a stepping motor or the like. In addition, in the event a single application of lubricant is sufficient, the rotation may be stopped by simply turning on the switch, and therefore in that case, there is no need to use the encoder.

The electromagnetic valve 23 is connected to the plunger driving pneumatic cylinder 26 of the plunger main body 2, and the supply direction of air to the plunger driving pneumatic cylinder 26 can be changed over by controlling the switching of the electromagnetic valve 23.

The second amplifier 24 is connected to a vertical driving motor 27 for sliding the prescribed liquid volume discharge device 1 vertically. Rotational motions of the motor 27 are converted into vertical motions via a feed screw. A driving voltage signal outputted from the second amplifier 24 is inputted in the vertical driving motor 27, whereby the vertical driving motor 27 is rotationally controlled.

The phase regulation unit includes the rotating device 9 as the rotary driving section, the sensor 13 and the control section 20.

Next, an operation will be described in which a lubricant is applied to the interior of the rolling bearing 700 by means of the prescribed liquid volume discharge device 1 which is constructed as described above.

The rolling bearing 700 to which a lubricant is to be applied is held at the holding portion 12 of the rotating table 11 of the rotating device 9, and thereafter, the rotating table 11 of the rotating device 9 is rotated by the rotational driving motor 25. Then, the rolling bearing 700 is rotated together with the rotating table 11, and when the rolling element 703 of the rolling bearing 700 is positioned directly below the lubricant discharge port 8, a rolling element detection signal is outputted from the sensor 13, and the rolling element detection signal so outputted is then inputted in the controller 21, whereby the rotational driving motor 25 is stopped. Following this, the vertical driving motor 27 is driven to be rotated in one direction so as to descend the vertically slidable table, whereby the prescribed liquid volume discharge device 1 is descended together with the vertically slidable table until it is stopped at a preset lower end of the lowering travel. The lower end is set in advance at a height where the lubricant discharge port 8 is positioned sufficiently close to the rolling element 703 (a state indicated by two-dot chain lines in FIG. 1).

When this state is produced, the electromagnetic valve 23 is controlled so as to be switched over by the controller 21, and the plunger of the plunger pump main body 2 of the prescribed liquid volume discharge device 1 is driven so that a lubricant 30 is discharged from the lubricating discharge ports 8 of the oil feed nozzle 6. In this state, since the lubricant discharge ports 8 are sufficiently close to the rolling elements 703, the lubricant 30 adheres to the rolling elements 703 and then flows into gaps, respectively, between the raceway surface of the outer race 701 of the rolling bearing 700 and the rolling element 703, the raceway surface of the inner race 702 and the rolling element 703, and the retainer 704 and the rolling element 703.

A lubricant application volume per rolling bearing is determined by a combination of a total of the inner race raceway surface area, the outer race raceway surface area and the surface area of the rolling element and the viscosity of the lubricant used.

In this embodiment, a plunger pump (model type: PM502) manufactured by UNICONTROLS (INC) is used, and also used as the oil supply pipe 7 is a tubular nozzle having an outside diameter of equal to or less than 1.5 mm and an inside diameter of substantially 0.2 mm to 1.0 mm. The length of the stroke of the plunger pump can be prescribed by a so-called micrometer type stopper, whereby the discharge volume of a lubricant can suitably be prescribed. In addition to the liquid lubricant, a semisolid lubricant such as grease can also be used.

In this embodiment of the present invention, a lubricant application volume was determined for each of various kinds of specifications (rolling element diameter, groove configuration or the like) of a rolling bearing having an outside diameter of 8 to 13 mm, an inside diameter of 4 to 5 mm and a width of 2 to 4 mm. First, a test was carried out for one of them to determine an appropriate lubricant application volume therefor, and thereafter a lubricant application volume was determined through a proportional calculation of the total surface area based on the results of the test.

In the case of the rolling bearing (having an outside diameter of 8 to 13 mm, an inside diameter of 4 to 5 mm and a width of 2 to 4 mm) in the aforesaid example, the lubricant application volume was determined in the range of 0.8 to 2.4 $\mu$l (micro liters) It is preferable that the lubricant application volume is set not in the range such that the lubricant is dropped from the discharge port, in a state before the lubricant is applied to the rolling bearing, but in the range such that the lubricant is retained in the discharge port 8 by surface tension of the lubricant for preventing the splash-of the lubricant, before the lubricant is applied to the rolling bearing.

When the application of the lubricant to the interior of the rolling bearing 700 is completed as described above, the discharge of the lubricant from the lubricant discharge port 8 is stopped, and the vertical driving motor 27 is then driven to be rotated in the other direction to thereby ascend the vertically slidable table, whereby the prescribed liquid volume discharge device 1 is ascended together with this vertically slidable table to be returned to the initial state of FIG. 1.

In this embodiment, the number of lubricant discharge ports 8 to be disposed is set so as be equal to that of rolling elements 703 of the rolling bearing 700 to be disposed, but the present invention is not limited thereto, and the number of lubricant discharge ports 8 to be disposed may be set so as to be smaller than that of rolling elements 703 to be disposed and in addition, the lubricant may be applied in a plurality of steps by changing the phase. Namely, for instance, there is provided a method in which the number of lubricant discharge ports 8 to be disposed is set to be a half the number of rolling elements 703 to be disposed (for instance, four) and a single prescribed liquid volume discharge device 1 is used, which method includes a first step wherein a lubricant is applied to four rolling elements 703 at intervals of every two rolling elements and a second step wherein after the rolling bearing 700 is rotated through 45 degrees, the lubricant is applied to the remaining four rolling elements 703.

Moreover, in this embodiment, the case is described where the single prescribed liquid volume discharge device 1 is used for application of the lubricant, but the present invention is not limited thereto, and in particular, in a case where the lubricant is applied in several steps and where such a method is incorporated in an automated production line, in order to reduce the cycle time, for instance, in a case where the application of the lubricant is carried out in two steps, two prescribed liquid volume discharge devices 1 may be used. In this case, the rotating device 9 having the holding portion 12 for the rolling bearing 700 is constructed so as to travel along the production line.

Furthermore, in this embodiment, the lubricant is constructed so as to be applied to all the rolling elements 703, but the lubricant is not necessarily applied to all the rolling elements 703. For instance, the lubricant is applied only to a part of the rolling elements 703, and thereafter the outer race 701 and the inner race 702 are rotated relative to each other for running-in rotations, whereby the lubricant so applied can be transferred to the raceway surfaces of the outer and inner races 701, 702 as in case where the lubricant is applied to all the rolling elements 703.

In addition, the number of lubricant discharge ports 8 to be disposed may be set to be smaller than that of rolling elements 703 to be disposed, but in this case, if the latter is too much larger than the former, there is caused a possibility that the lubricant flows out to portions other than those actually needing lubrication, and therefore, an application volume per rolling element is reduced by applying the lubricant in a plurality of steps while changing the phase (in other words, a lubricant application volume per rolling element is reduced), as is described above, or if the application of the lubricant is possible, the number of lubricant discharge ports 8 to be disposed is made close (or equal) to that of the rolling elements 703 to be disposed. In addition, in a case where the discharge volume of the lubricant is too large even if the number of lubricant discharge ports 8 that are disposed is made close to that of rolling elements 703 that are disposed, such a drawback can be dealt with by reducing the discharge velocity (flow rate at the time of discharge) of the lubricant. In other words, the discharge velocity of the lubricant is set to match a velocity at which the lubricant penetrates into gaps between the rolling element 703 and the raceway surface of the outer race 701, the rolling element 703 and the raceway surface of the inner race 702, the rolling element 703 and the retainer 704, the retainer 704 and the outer race 701, and the retainer 704 and the inner race 702.

With an appropriate application volume of the lubricant, if the lubricant is applied using the aforesaid methods, there is no risk of the lubricant flowing out to portions other than those needing lubrication, the lubricant being thus applied to and held at only portions actually needing lubrication.

Since there is provided to the prescribed liquid volume discharge device 1 a minimum discharge volume as a limit, in a case where the application volume is lower than the minimum discharge volume, a method is adopted in which a lubricant diluted with a solvent is discharged. In this case, it is needless to say that an application volume to be set is a volume of the lubricant remaining after the solvent vaporizes.

Moreover, in this embodiment, the method is adopted in which after the lubricant discharge ports 8 are caused to approach the rolling elements 7 sufficiently, a prescribed volume of lubricant is discharged from the lubricant discharge ports 8 and is transferred to the rolling elements 703. The present invention, however, is not limited thereto. For example, an oil droplet is formed at a distal end of the lubricant discharge port 8 by discharging the prescribed volume of lubricant from the lubricant discharge port 8 in such a manner as not to drop therefrom before the lubricant discharging port 8 approaches the rolling elements 703. It is preferable that the oil droplet is formed in the range of size such that the lubricant does not drop from the lubricant discharge port 8, that is, that the oil droplet is retained in the lubricant discharge port 8 by surface tension of the lubricant. Thereafter, the lubricant discharge ports 8 is allowed to approach the rolling elements 703 so that the oil droplets at the lubricant discharge ports 8 are brought into contact with the rolling elements 703, respectively, whereby the lubricant can be applied to the rolling elements 703.

In addition, in this embodiment, the case is described in which after the rolling elements 703 of the rolling bearing 700 to which the lubricant is to be applied are positioned directly below the oil feed pipes 7, the prescribed liquid volume discharge device 1 is lowered. But, if it is constructed such that an interference of the sensor 13 with the oil feed nozzle 6 or the like is avoided, the prescribed liquid volume discharge device 1 may be constructed so as to be lowered immediately after the rolling bearing 700 has been attached to and held at the holding portion 12 of the rotating device 9.

Moreover, in this embodiment, the rolling elements 703 of the rolling bearing 700 to which the lubricant is to be applied are set such that they are positioned directly below the oil feed pipes 7 when the sensor 13 detects them. However, the rolling elements 703 of the rolling bearing 700 to which the lubricant is to be applied may not be set such that they are positioned directly below the oil feed pipes 7 when the sensor 13 detects them. That is, a rotational angle of the rotating table 11 of the rotating device 9 from a state that the sensor 13 detects the rolling elements 703 to a position where the rolling elements 703 are positioned directly below the oil feed pipes 7 is measured in advance, and the rotational angle so measured is stored in a storage section of a rotation control device of the rotating device 9 as a compensation angle, whereby the rotating table 11 of the rotating device 9 may be constructed so as to be stopped after it is rotated through the compensation angle after the sensor 13 detects the rolling elements 703 of the rolling bearing 700 to which the lubricant is to be applied.

Furthermore, in this embodiment, the sensor 13 is adapted to detect the rolling elements 703 of the rolling bearing 700 to which the lubricant is to be applied, but if the phase of the rolling elements 703 when the sensor 13 detects is constant at all times, the sensor 13 may be constructed so as to detect any other constituent component than the rolling elements 703, for instance, the part of the retainer 704.

Moreover, in this embodiment, the prescribed liquid volume discharge device 1 is adapted to slide in the vertical directions, but the present invention is not limited thereto, and the rolling bearing 700 to which the lubricant is to be applied may be Constructed so as to slide in vertical directions.

In addition, in this embodiment, the motor is employed to slide vertically the prescribed liquid volume discharge device 1, but any other means including, for instance, a pneumatic cylinder or the like may be used to drive the device.

Second Embodiment

Next, referring to FIGS. 5A and 5B, a second embodiment of the present invention will be described below.

Figure 5A:
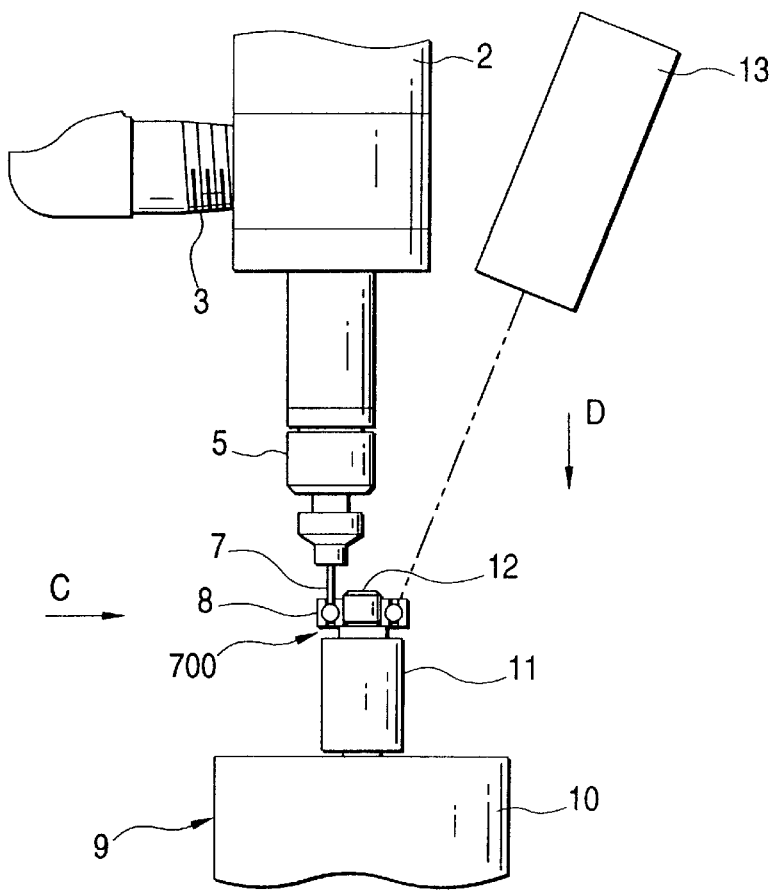
FIGS. 5A and 5B are side views showing the construction of a main portion of a lubricant applying apparatus for use in carrying out a lubricant application method according to a second embodiment of the present invention.
Figure 5B:
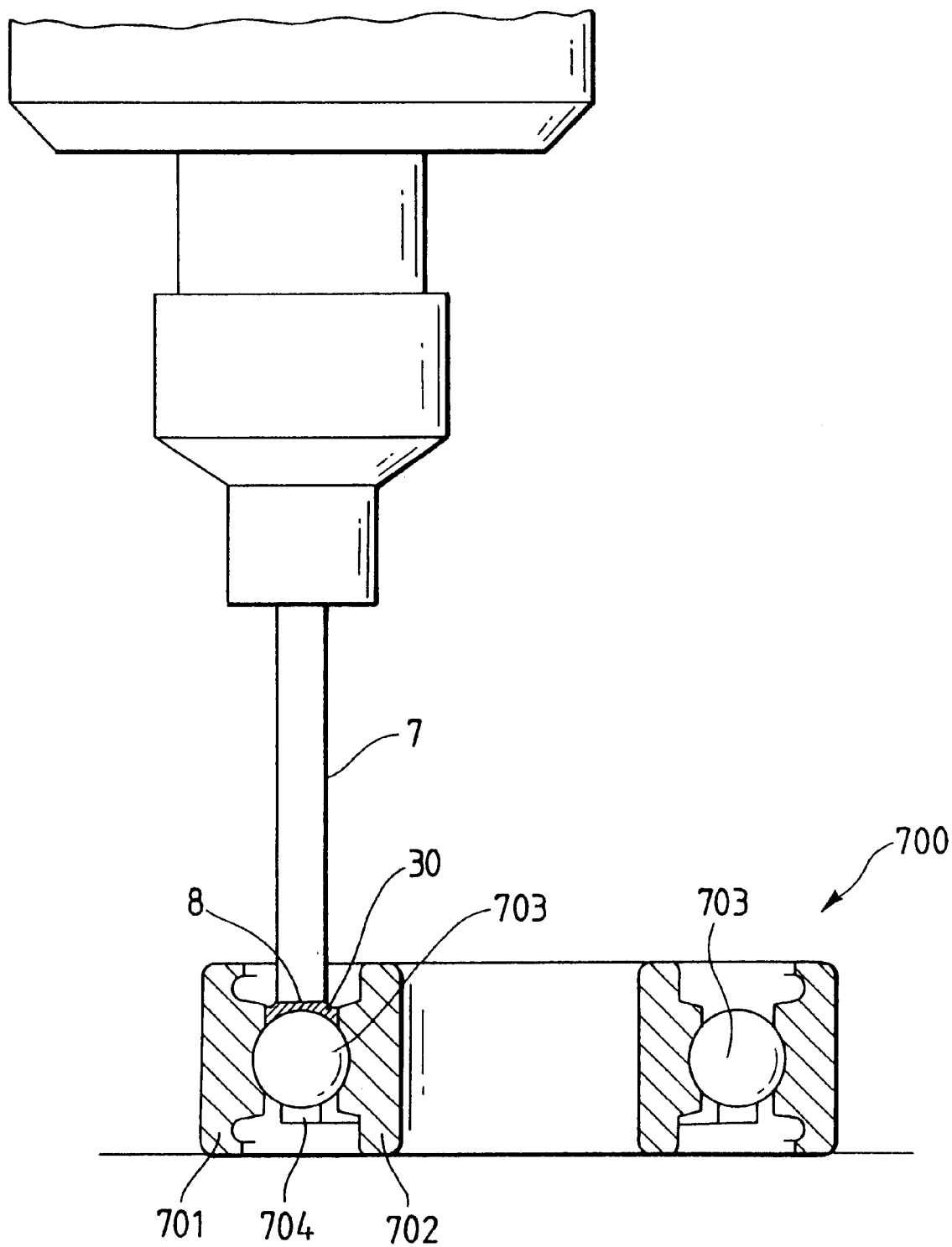

FIGS. 5A and 5B are side views showing the construction of a main portion of a lubricant applying apparatus according to this embodiment, and the figure shows a state in which the prescribed liquid volume discharge device 1 is descended. In addition, in FIGS. 5A and 5B, like reference numerals are given to constituent components like to those described in the aforesaid first embodiment shown in FIG. 1.

In this embodiment, what is different from the first embodiment described above is that a single oil feed pipe 7 is provided on the oil feed nozzle 6. As well as the first embodiment, the oil supply pipe 7 is a tubular nozzle having an outside diameter of equal to or less than 1.5 mm and an inside diameter of substantially 0.2 mm to 1.0 mm.

According to this embodiment, the construction of the oil feed nozzle 6 is simplified by employing the construction in which the single oil feed pipe 7 is provided on the oil feed nozzle 6, and moreover, the relative position control between the oil feed pipe 7 and the rolling elements 703 of the rolling bearing 700 to which the lubricant is to be applied is made simpler than in the first embodiment described above.

Furthermore, since other constructions, functions and effectiveness of this embodiment are identical to those of the aforesaid first embodiment, descriptions thereof will be omitted.

Third Embodiment

Next, referring to FIG. 6, a third embodiment will be described below.

Figure 4:
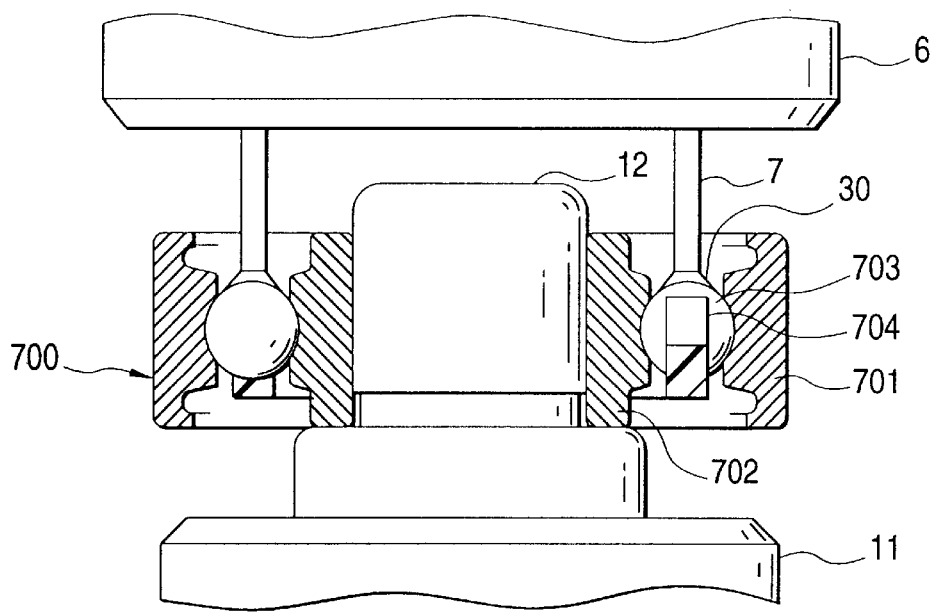
FIG. 4 is an enlarged view showing the detailed construction of a portion circled by Circle X in FIG. 1.
Figure 6:
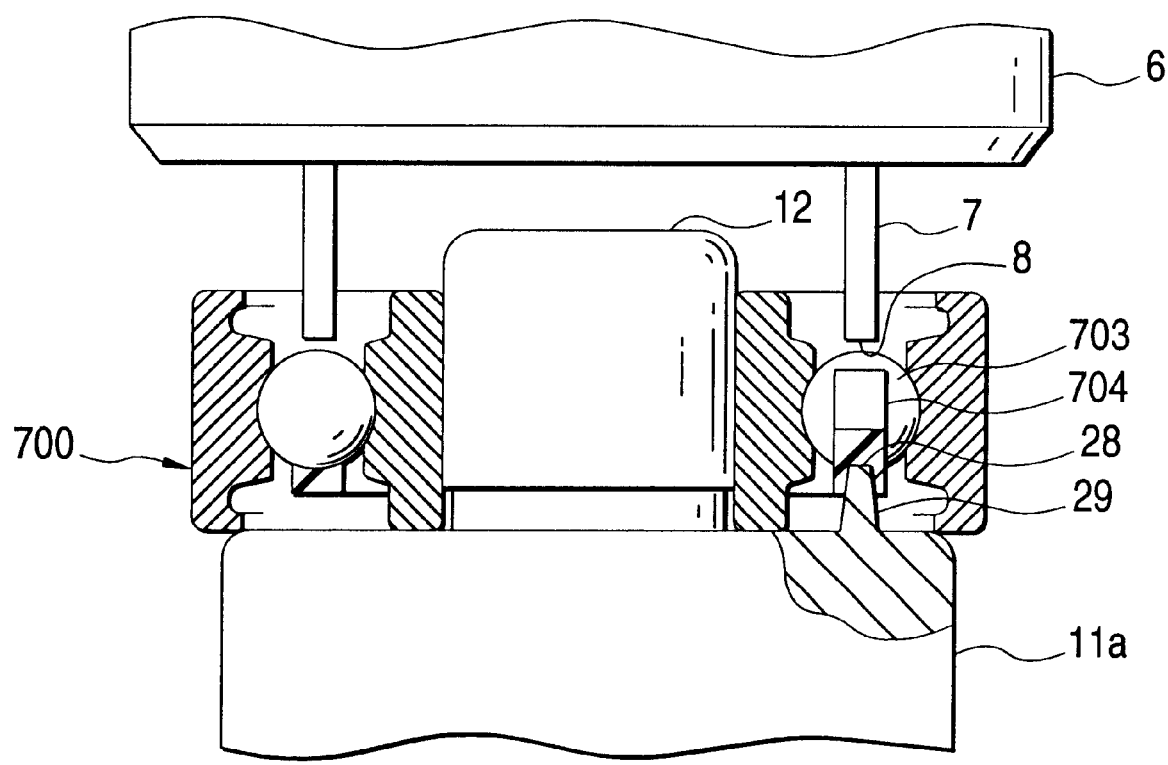
FIG. 6 is an enlarged view corresponding to FIG. 4 and showing a lubricant applying apparatus for use in carrying out a lubricant application method according to a third embodiment of the present invention.

FIG. 6 is a side view showing the construction of a main portion of a lubricant applying apparatus according to this embodiment, and the figure corresponds to FIG. 4 showing the above-described first embodiment of the present invention. In addition, in FIG. 6, like reference numerals are given to constituent components like to those described in the above first embodiment shown in FIG. 1.

In this embodiment, what is different from the first embodiment is that the rolling elements 703 of the rolling bearing 700 are positioned directly below the lubricant discharge ports 8 using a mechanical method, whereas in the first embodiment, the rotating device 9 and the sensor 13 are used for positioning the rolling elements 703 of the rolling bearing 700 directly below-the-lubricant discharge ports 8.

Namely, as shown in FIG. 6, a concave engagement portion (engagement portion) 28 is formed in a lower face of the retainer 704 of the rolling bearing 700, and a convex engagement portion (engagement portion ) 29 is formed on an upper face of a holding table 11a having the holding portion 12 for the rolling bearing 700, whereby the rolling elements 703 of the rolling bearing 700 to which the lubricant is to be applied are positioned directly below the lubricant discharge ports 8 through an engagement of the convex engagement portion 29 of the holding table 11a with the concave engagement portion 28 of the retainer 704.

According to this embodiment, since the retainer 704 is constructed so as to be locked on the holding table 11a at a predetermined phase through the engagement of the convex engagement portion 29 of the holding table 11a with the concave engagement portion 28 of the retainer 704, the rolling elements 703 of the rolling bearing 700 to which the lubricant is to be applied can be positioned directly below the lubricant discharge ports 8 with a simple construction.

In the case of this embodiment, if the lubricant can be applied in a single step, there is no need to rotate the holding table 11a. In other words, the rotating device 9 having he rotating table 11 is not needed and the holding table may only have to be constructed so as to be engaged and held as shown in FIG. 6. In this case, however, if the lubricant is applied by using a single prescribed liquid volume discharge device 1 in a plurality of steps by changing the phase of the rolling bearing, it is needless to say that the rotating device 9 and the like are needed as a matter of fact.

In addition, in the case of this embodiment, although the concave engagement portion 28 is formed in the retainer 704 of the rolling bearing 700 and the convex engagement portion 29 which is adapted to be brought into engagement therewith is formed on the holding table 11a, but the present invention is not limited thereto. For instance, if a crown-shaped retainer having convex and concave portions is used as the retainer, engagement portions may be provided on the holding table 11a in such a manner as to be brought into engagement with those convex and concave portions.

Since other constructions, functions and effectiveness of this embodiment are identical to those of the aforesaid first embodiment, descriptions thereof will be omitted.

In addition, this embodiment may be constructed so as to be combined with the first embodiment (or a modified example thereof) or the second embodiment (or a modified example thereof) both of which constitute the features and constructions of this third embodiment.

Fourth Embodiment

Next, referring to FIG. 7, a fourth embodiment of the present invention will be described below.

Figure 7:
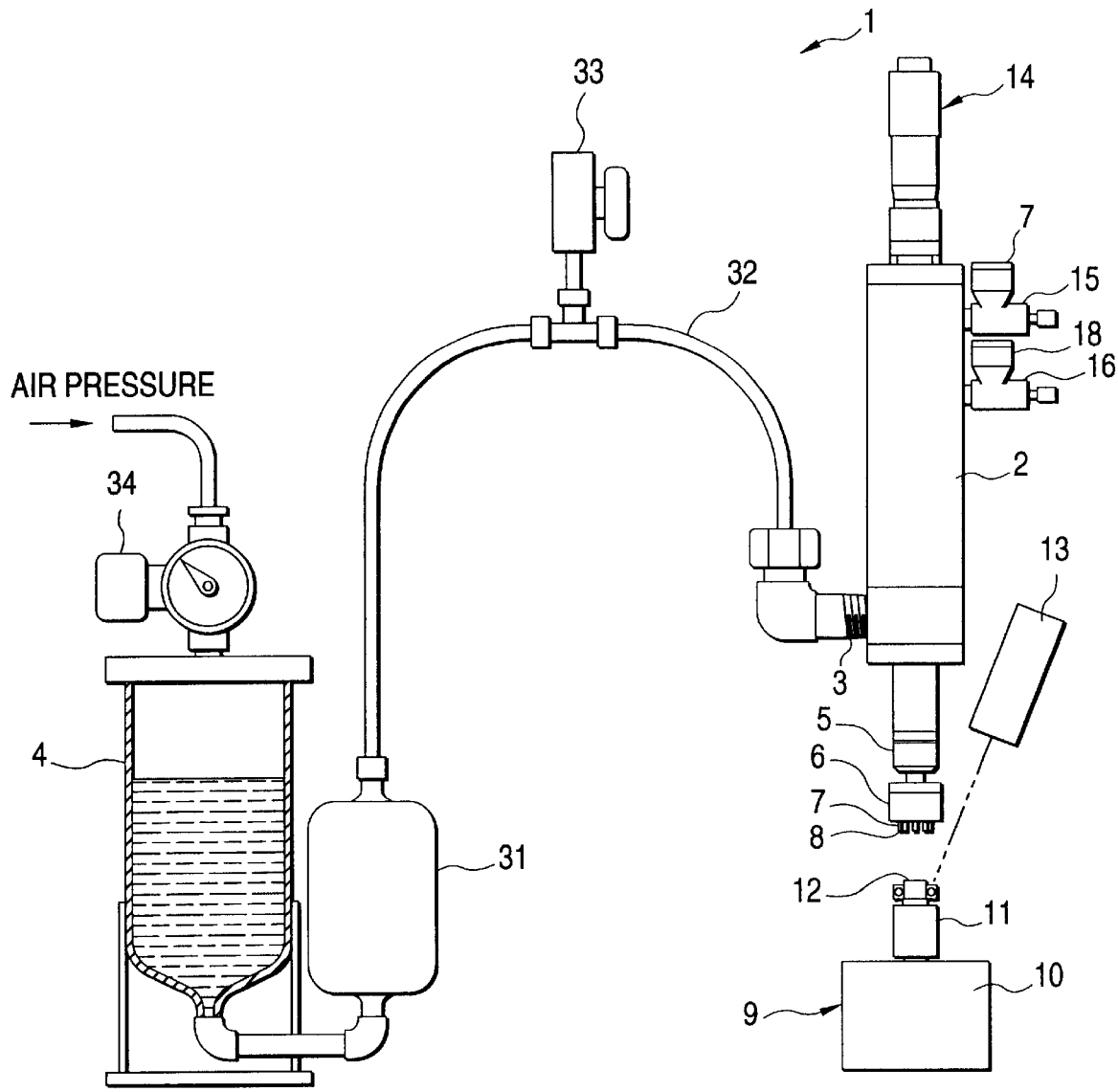
FIG. 7 is a side view showing the construction of a lubricant applying apparatus for use in carrying out a lubricant application method according to a fourth embodiment of the present invention.

FIG. 7 is a side view showing the construction of a lubricant applying apparatus according to this embodiment and in the figure, like reference numerals are given to constituent components like to those shown in FIG. 1.

In this embodiment, what is different from the aforesaid first embodiment is that the lubricant tank 4 is provided apart from the plunger pump main body 2.

The lubricant tank 4 of this embodiment is constructed so as to be tightly closed, and the lubricant contained in the interior thereof can pneumatically be pressurized and sent out under pressure.

A filter 31 is connected to an output port of the lubricant tank 4, and a flexible tube 32 is disposed so as to connect the output port side of this filter 31 with the liquid suction port 3 of the plunger pump main body 2 in order that vertical movements of the plunger pump main body 2 are not interrupted. This tube 32 is branched at a central portion thereof and a air vent cock 33 is connected between the branched tubes. In addition, in FIG. 7, reference numeral 34 denotes an air pressure regulator.

According to this embodiment, the frequency of refilling lubricant can be reduced by increasing the capacity of the lubricant tank 4. In addition, a lubricant of a high degree of cleanness can be supplied to the plunger pump main body 2. In other words, a lubricant of a high degree of cleanness can be supplied to the rolling bearing.

Fifth Embodiment

Next, referring to FIGS. 8–11, a fifth embodiment of the present invention will be described below.

In this embodiment, a description will be given of an inspection method for inspecting whether or not the lubricant is discharged from the oil feed pipe 7 with the discharge apparatus 1 of the second embodiment shown in FIG. 5. In the figures, like reference numerals are given to constituent components like to the prior embodiments.

Figure 8:
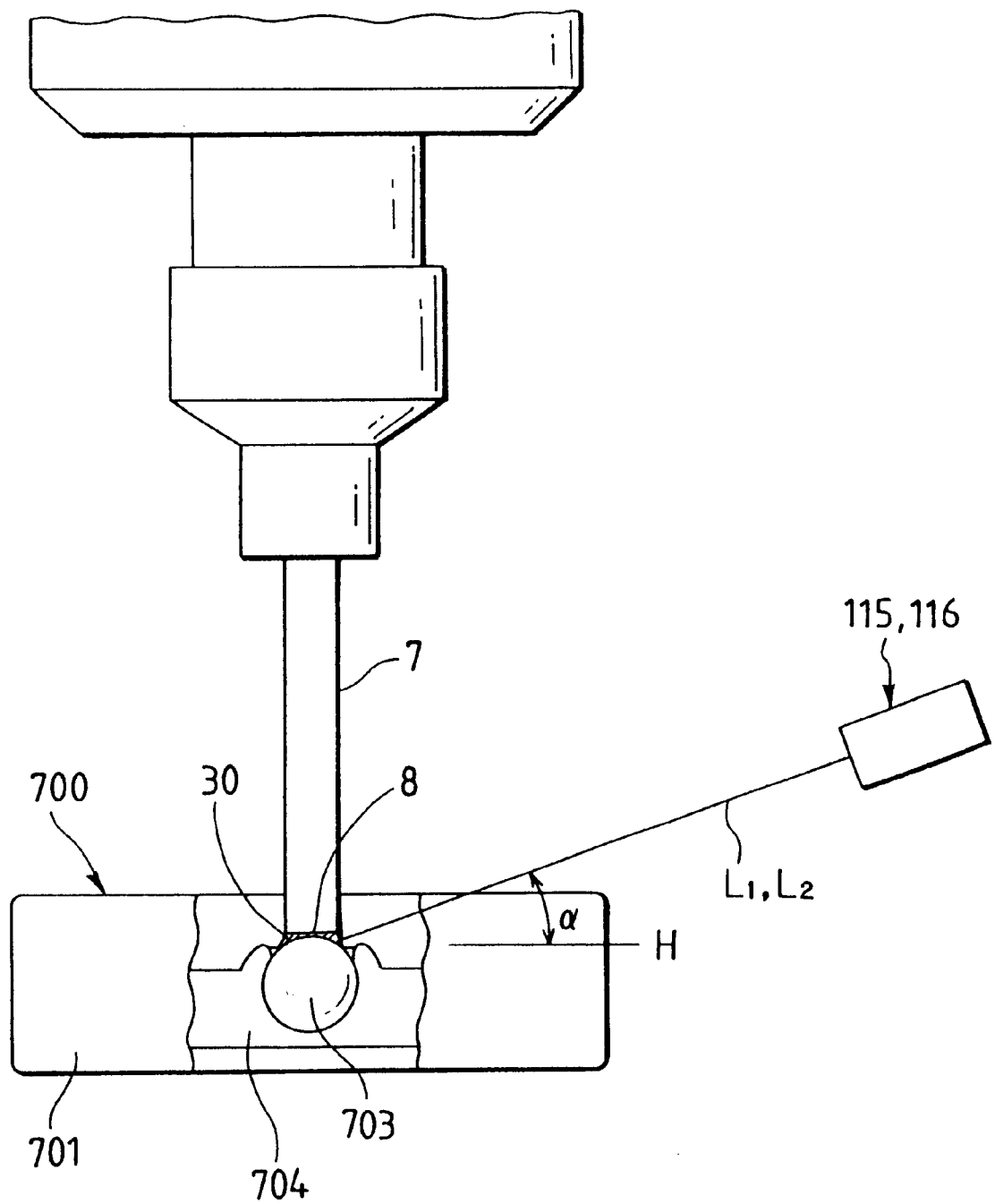
FIG. 8 is a partially sectional and cut-away view as viewed from a direction C in FIG. 5 showing a lubricant applied condition inspecting apparatus according to a fifth embodiment of the present invention.
Figure 9:
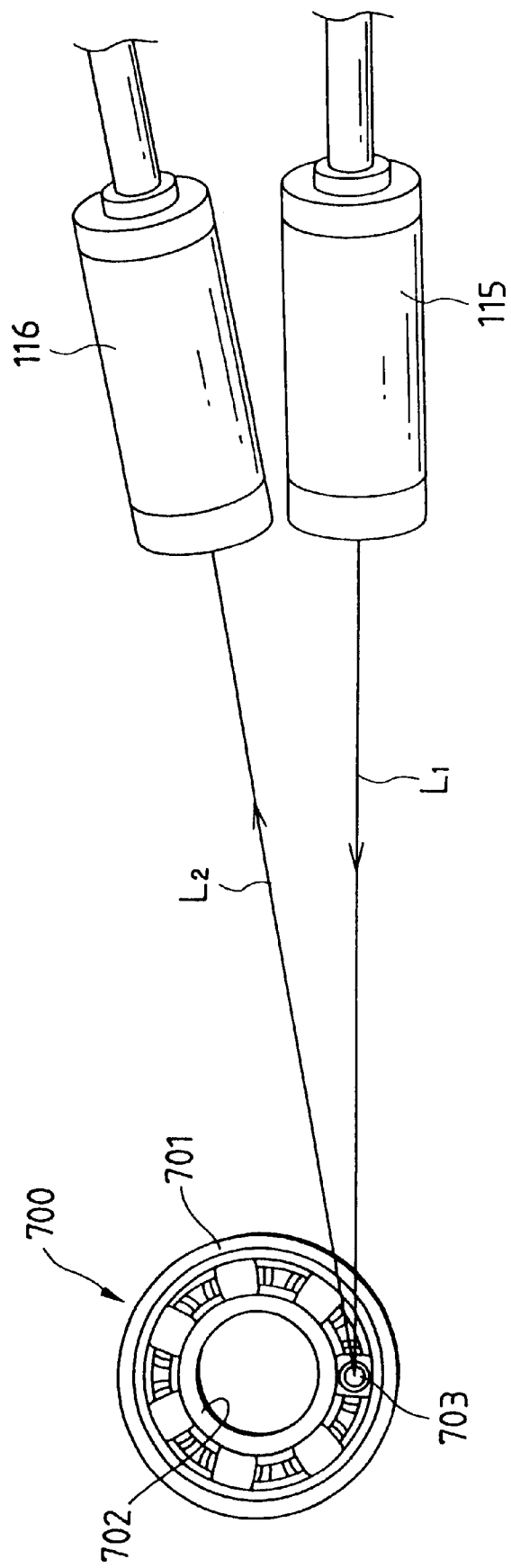
FIG. 9 is a plan view as viewed from a direction D in FIG. 5 showing the lubricant applied condition inspecting apparatus according to the fifth embodiment.

In this embodiment, as shown in FIGS. 8 and 9, a laser beam $L_1$, is irradiated from a laser beam projector (hereinafter, referred to briefly as a projector) 115 to a discharge position of the lubricant, and in a case where the lubricant is applied, a reflected laser beam $L_2$ is received by a laser beam photoreceptor (hereinafter, referred to briefly as a photoreceptor) 116, whereby a lubricant applied condition of the rolling element 703, that is, whether or not the lubricant is accurately discharged to be applied to the surface of the rolling element 703 is inspected. To be more specific, in a case where the lubricant is accurately discharged, as shown in FIG. 8, a lubricant droplet is formed by virtue of surface tension between the surface of the rolling element 703 and the lubricant discharge port 8 of the oil supply pipe 7. When this oil droplet is irradiated with the laser beam $L_1$, the reflected laser beam $L_2$ is caused to enter the photoreceptor 116 from the surface of the oil droplet. Then, the photoreceptor 116 generates a voltage substantially in proportion to the intensity of the laser beam received.

When the photoreceptor 116 receives the reflected laser beam $L_2$, even if the prescribed volume of the lubricant is not discharged and hence there is formed no oil droplet, depending on an irradiating position of the laser beam $L_1$, the reflected light may directly enter the photoreceptor 116 from the surface of the rolling element 703. Then, irrespective of no lubricant being discharged, it may be erroneously understood from such detection of the reflected laser beam $L_2$ that the lubricant is properly discharged. To cope with this, in this embodiment, mounting positions of the projector 115 and the photoreceptor 116 are set such that an angle becomes as acute as possible which is formed between the laser beam $L_1$, projected from the projector 116 and a perpendicular plane H perpendicular to an axis of the rolling bearing 700. Due to this, in order that the laser beam does not interfere with the outer race of the rolling bearing, the projector 115 is disposed such that the laser beam $L_1$, projected from the projector 115 is directed substantially in a tangent direction of a pitch circle of a rolling element of the rolling bearing.

To be specific, as shown in FIG. 8, a projection angle α of the laser beam projected to the rolling element 703 is set so as to become acute relative to the horizontal plane H, for instance, an angle equal to or smaller than 30 degrees. In addition, an angle formed between the projector 115 and the photoreceptor 116 is set, as shown in FIG. 9, by disposing the photoreceptor 116 at a position where the reflected laser beam $L_2$ of a sufficient intensity can be obtained from the oil droplet on the rolling element 703.

In the case of a bearing of a small diameter, a minute volume of lubricant is injected, and in order to perform a precise injection, it is desirable that the lubricant discharge port 8 of the oil supply pipe 7 is sufficiently close to the rolling element 703. Then, in order to irradiate the laser beam $L_1$ between the lubricant discharge port 8 and the rolling element 703 which are disposed sufficiently-close to each other, the spot diameter of the laser beam $L_1$, needs to be made minute.

Next, referring to FIG. 10, described below will be the construction of a lubricant applied condition inspecting apparatus 120 according to the embodiment of the present invention.

Connected to a control section 125 for controlling the operations of the lubricant applied condition inspecting apparatus 120 in a generalized fashion are a laser driving section 121 for driving and controlling the projector 115 of the laser beam, a pump driving section 122 for driving a plunger pump 2 for the discharge device 1 and a bearing race rotary driving section 123 for rotating the bearing race of the rolling bearing 700 such that the position of the rolling element 703 coincides with the position of the lubricant discharge port 8 of the oil supply pipe 7.

In addition, the lubricant applied condition inspecting apparatus 120 further includes a peak hold circuit 127 inputting an output signal generated from the photoreceptor 116 when the reflected laser beam is received thereby through reception of the reflected laser beam reflected from the oil droplet of lubricant by the photoreceptor 116 and holding the peak level of the output signal when receiving the reflected laser beam, and an OK/NG judgement circuit 128 for receiving the output signal from the peak hold circuit 127 so as to judge whether or not the lubricant is discharged. The control section 125 outputs a rest signal for releasing the peak level held by the peak hold circuit 127 at an timing which will be described later.

Connected to this control section 125 are a NG product discharge device 148, a display 149, and an alarming device 150, whereby the control section 125 controls the NG product discharge device 148 such that it discharges the bearing 147 based on a signal from the judgement circuit 128. At this moment, the display 149 and the alarming device 150 are actuated selectively by the control section 125.

Next, a description will be given of an inspection method for inspecting a lubricant applied condition of the rolling bearing 700.

First, the rolling bearing 700 is mounted on a fixing jig, (not shown) of an applying apparatus, and a position regulation of the lubricant discharge port 8 of the oil supply pipe 7 and the rolling element 703 of the rolling bearing 700 is carried out. Various methods can be conceived as a method for this regulation, and for instance, one of them is a regulation method including the steps of rotationally driving the inner race 702 by the bearing race rotational driving section 123 so as to change the positions of the rolling elements 703, irradiating a laser beam from the projector 115 as previously described by the laser driving section 121 and detecting the intensity of a reflected laser beam by the photoreceptor 116 for regulation. According to this method, a rotational position where the intensity of the reflected laser beam is enhanced to become a peak coincides with a position where the laser beam is irradiated to the rolling element 703, and this position is spaced away a certain distance from a position where the rolling element 703 is disposed directly below the lubricant discharge port 8 of the oil supply pipe 7. This spaced away distance is determined by a positional relationship including the directions of the projector 115, the photoreceptor 116 and the bearing 700. Therefore, a rotational angle of the inner race corresponding to that spaced away distance is measured in advance and is then stored in the control device 125. With a further rotation through the stored angle from a rotational position where the intensity of the reflected laser beam becomes the peak, a state is produced in which the rolling element 703 is disposed directly below the lubricant discharge port 8 of the oil supply pipe 7.

In this position regulation method, when the lubricant is applied to the respective balls one by one by moving them in that way, the regulation may be performed every time the balls are moved with a view to having an accurate regulation. In addition, if the number of rolling elements 703 is known in advance, the position of the rolling elements 703 may simply be set by detecting the position of only one of the rolling elements and using an index rotation for the remaining rolling elements 703 in which they are rotated through a predetermined certain angle.

Figure 11:
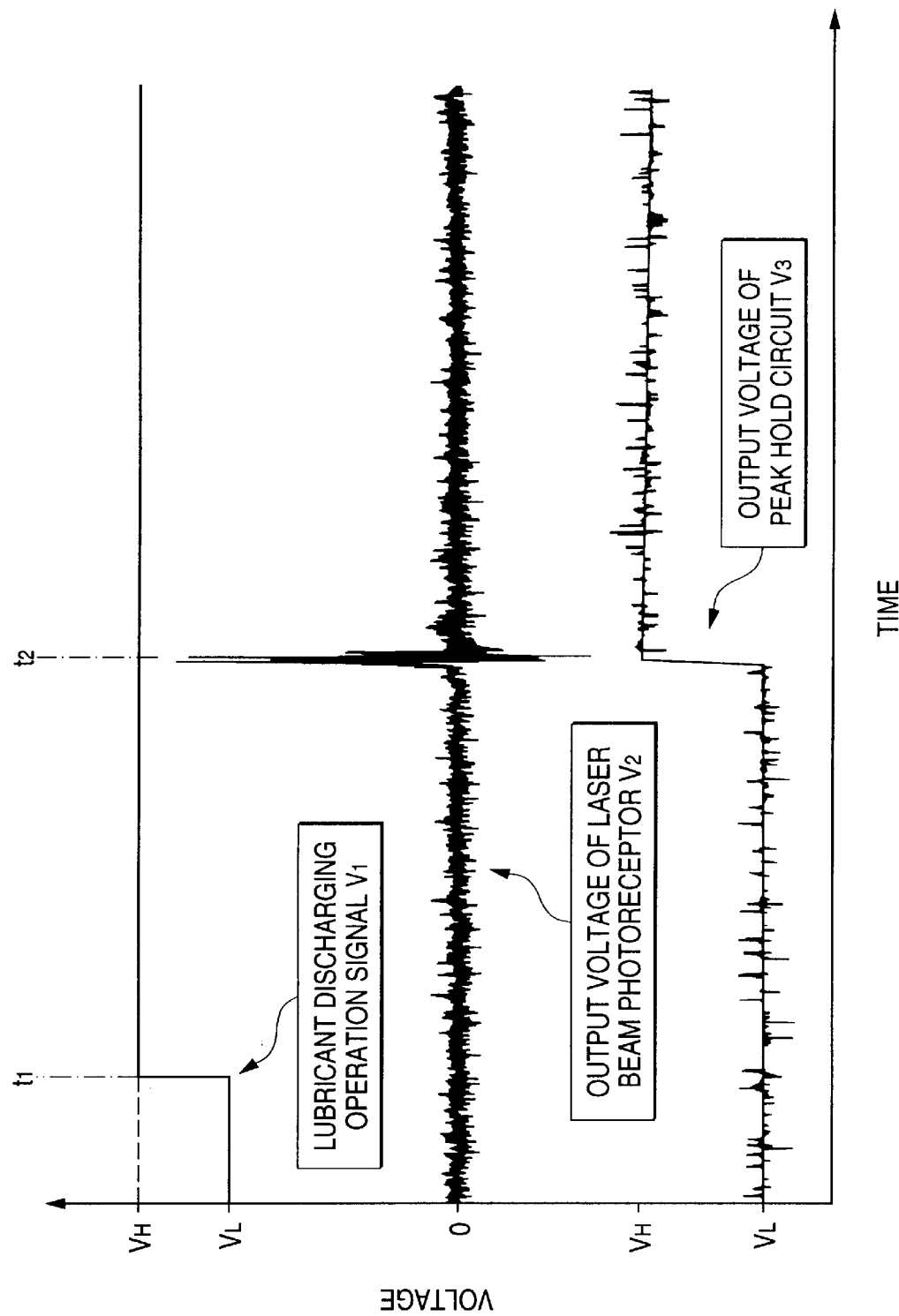
FIG. 11 is a chart showing wave forms of a lubricant discharging operation signal, the output voltage of a laser beam photoreceptor and the output voltage of a peak hold circuit.

After the regulation of the rolling elements 703, since the peak level is held in the peak hold circuit 127 by the reflected light from the rolling element 703, in order to restore the initial voltage level, a rest signal is outputted from the control section 125, and then a driving signal (a lubricant discharging operation signal) $V_1$, is supplied from the control section 125 to the pump driving section 122 at a point $t_1$, shown in FIG. 11, whereby the lubricant is discharged from the discharge apparatus 1.

The discharge apparatus 1 adopts a system for extruding the lubricant by driving the plunger, and therefore there is caused a time lag between an input of the discharging operation signal $V_1$, and an actual discharge of the lubricant from the lubricant discharge port 8. Then, when the lubricant is discharged from the lubricant discharge port 8 at a point $t_2$, there is instantly caused a large variation in the output signal $V_2$ from the photoreceptor 116.

Figure 10:
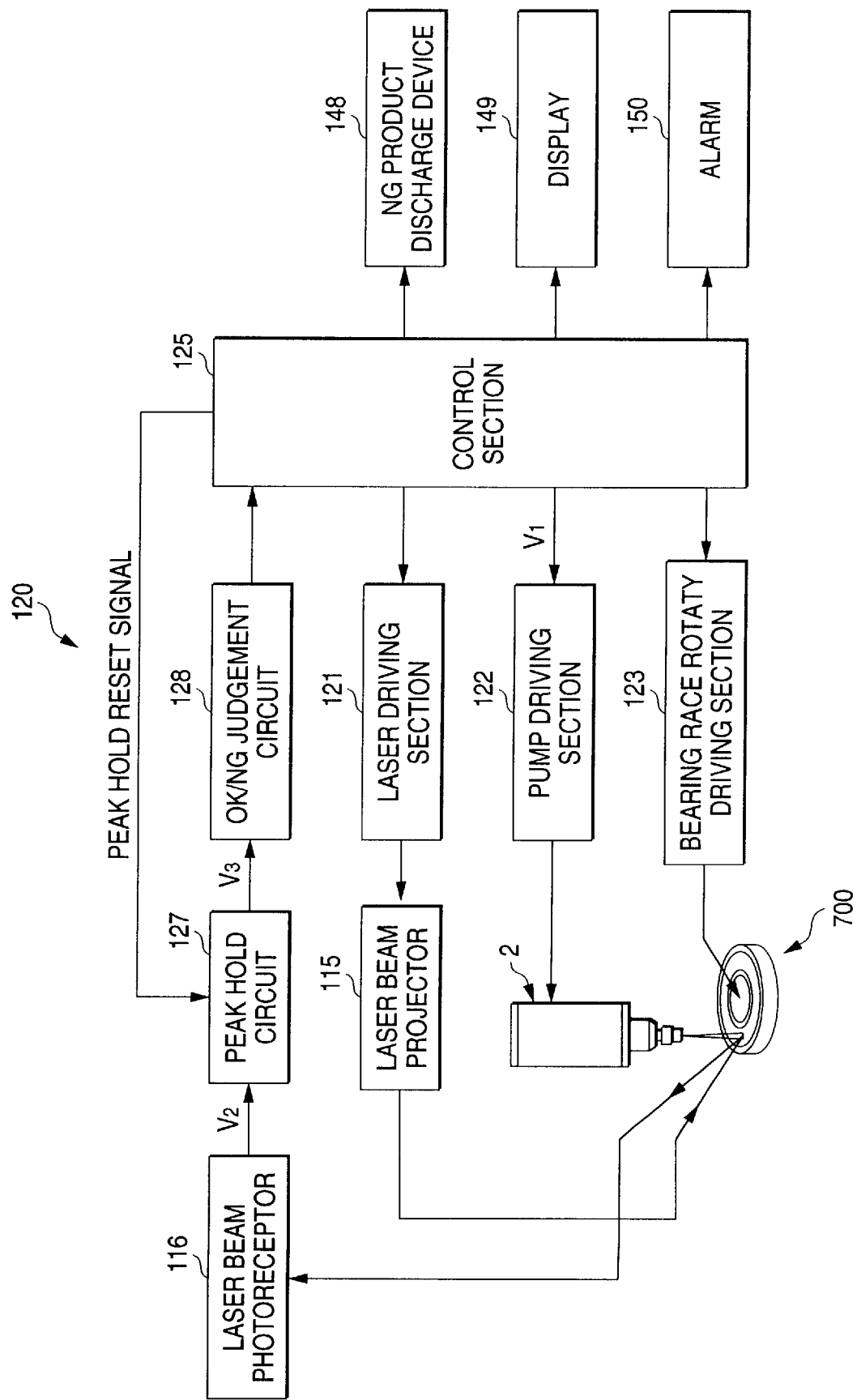
FIG. 10 is a block diagram showing the construction of the lubricant applied condition inspecting apparatus according to the fifth embodiment.

When the voltage level of the output signal $V_2$ largely varies as shown in FIG. 11, the peak hold circuit 127 shown in FIG. 10 detects this variation in voltage level, and the output signal $V_3$ of the peak hold circuit 127 varies from $V_L$ to $V_H$. The OK/NG judgement circuit 128 judges whether or not the lubricant is discharged in response to those two states of $V_H$ and $V_L$.

In a case where the lubricant is judged as being discharged properly based on the judgement results from the OK/NG judgement circuit 28, the control section 125 outputs a peak hold reset signal for resetting the voltage level of the output signal set at $V_H$ in the peak hold circuit 127 to the initial state. In addition, the control section 125 rotates the inner race by the bearing race rotational driving section 123 so as to perform a position regulation of the following rolling element 703 for discharging the lubricant thereto and inspecting the lubricant applied condition thereof.

On the other hand, in a case where the discharge of the lubricant is judged as abnormal, the control section 125 outputs an abnormal signal for alarming, stops the application of the lubricant, stops the machine, or performs an NG discharge of the bearing under inspection as a defective, whereby it is possible to prevent a rolling bearing to which the lubricant is abnormally applied from being transferred out to a post process.

The aforesaid process is repeatedly performed until the lubricant is applied to all the rolling elements 703.

Thus, in the method for inspecting the application of lubricant according to the present invention, the rolling element 703 is registered directly below and close to the lubricant discharge port 8 for discharging the lubricant, and thereafter the lubricant is discharged onto the rolling element 703, while the laser beam is irradiated from the side thereof for detection of the existence of a reflected laser beam from a prescribed direction. Then, the reflected light of the laser beam is generated only a short time period during which the lubricant is discharged, but with the utilization of the peak hold circuit 127, a variation in the output signal from the photoreceptor 116 can be detected with high sensitivity, whereby a detection with high sensitivity is performed without escaping even a momentary variation in the output signal.

In addition, since the projector 115 and the photoreceptor 116 are constructed so as to be disposed separately from each other, it is possible to enhance the degree of freedom of design in location of equipment and regulation thereof.

According to the lubricant applied condition inspecting apparatus constructed as described above, in the case of mass production of rolling bearings in which the lubricant is injected into the interior thereof, automatic total inspection can be carried out for every rolling bearing to inspect whether or not the lubricant is injected thereinto, whereby the quality and reliability of rolling bearings so produced can be improved, while reducing the production costs.

Further, the projector 115 and the photoreceptor 116 are can be used as the sensor of the first embodiment for performing the positioning function.

Since other constructions such as the discharge apparatus, functions and effectiveness of this embodiment are identical to those of the aforesaid second embodiment, descriptions thereof will be omitted.

Of course, the lubricant applied condition inspecting apparatus of this embodiment can be applied to any discharge apparatus of the first to fourth embodiments. In particular, in case that the lubricant applied condition inspecting apparatus is applied to the discharge apparatus of the first embodiment, the application and the inspection of the lubricant are simultaneously performed with respect to a plurality of rolling elements 703 of the rolling member 700. As to the inspection of a lubricant applied condition, since a substantially equal volume of lubricant is discharged from the respective oil supply pipes 7, the lubricant applied condition of all the balls can be grasped by inspecting only one of the balls for the lubricant applied condition. In addition, as described above, the reliability of inspection can be improved by inspecting individually the rolling elements 703 through irradiation of the laser beam to the rolling elements 703 one by one. Furthermore, the laser beam may be constructed so as to be irradiated to the plurality of rolling elements 703 at one time for inspection, and in this case, since a plurality of inspection systems are used for inspection, not only can the reliability of inspection further be improved but also the inspection can be carried out far faster.

In this embodiment, the lubricant is discharged onto the rolling elements 703 of the rolling bearing, but on top of that method, the lubricant applied condition inspecting apparatus of this embodiment can be applied to a discharge apparatus that the lubricant may be constructed so as to be discharged onto the retainer between the rolling elements. In addition, as to the lubricant, on top of the liquid lubricant, a grease-like solid lubricant may equally be applicable.

Sixth Embodiment

Figure 12:
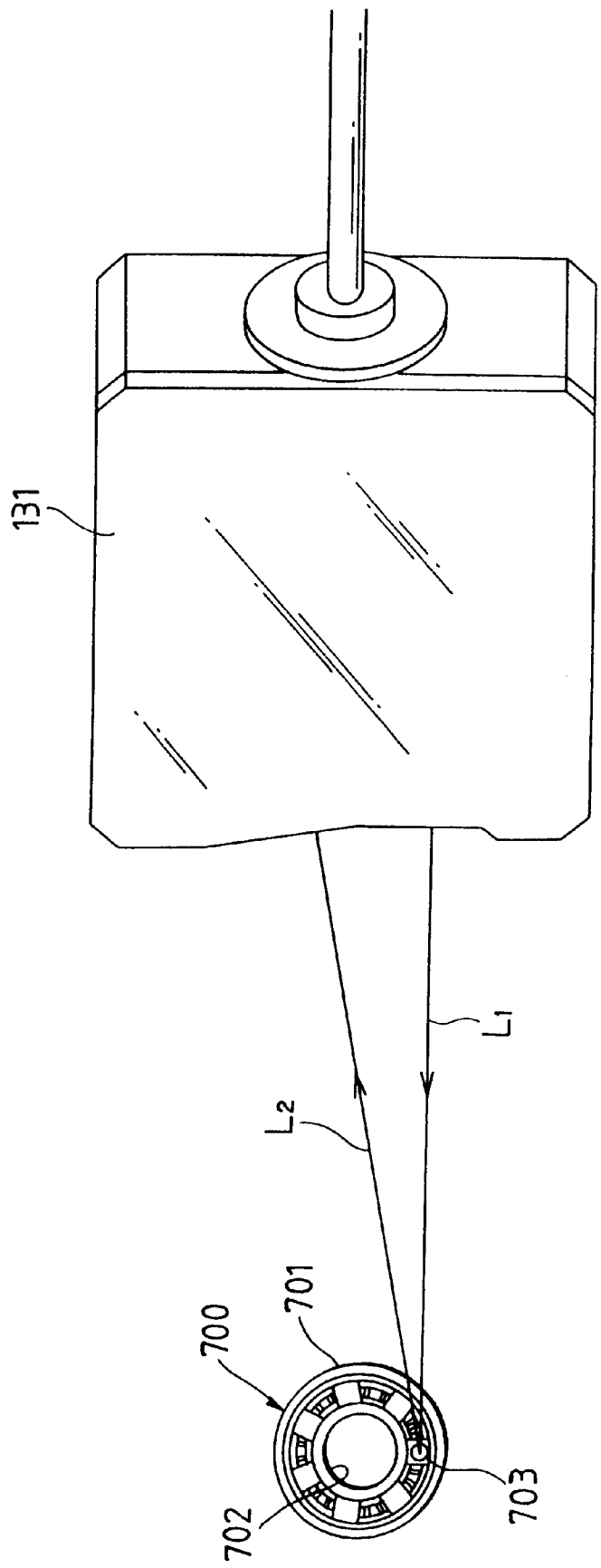
FIG. 12 is a diagram showing the construction of a laser sensor for a lubricant applied condition inspecting apparatus according to a sixth embodiment of the present invention.

Next, referring to FIG. 12, described below will be a sixth embodiment of the lubricant applied condition inspecting apparatus according to the present invention. This embodiment is characterized in that the projector and the photoreceptor of the fifth embodiment are integrated into one construction, and like reference numerals are given to functional components, whereby descriptions that would overlap previous ones will be omitted.

In this embodiment, a laser sensor 131 is used in which the projector and the photoreceptor are integrated. According to this construction, there is no need of angle regulation of the laser beams $L_1$, $L_2$, in other words, no angle adjustment is needed which is set from the set positions of the projector 115 and the photoreceptor 116. This simplifies largely the assembling work of the lubricant applied condition inspecting apparatus and the construction of the entirety of the inspecting device as well. In addition, for instance, a laser projecting and receiving device LZ-155 manufactured by Keyence Corporation. may be used as the projector 15 and the photoreceptor 16 of this embodiment.

This laser sensor 131 can be also used as the sensor 13 of the first embodiment for performing the positioning function.

Seventh Embodiment

Next, referring to FIGS. 13 and 14, described below will be a lubricant applying system according to a seventh embodiment of the present invention, specifically, the another lubricant applied condition inspecting apparatus.

Figure 13:
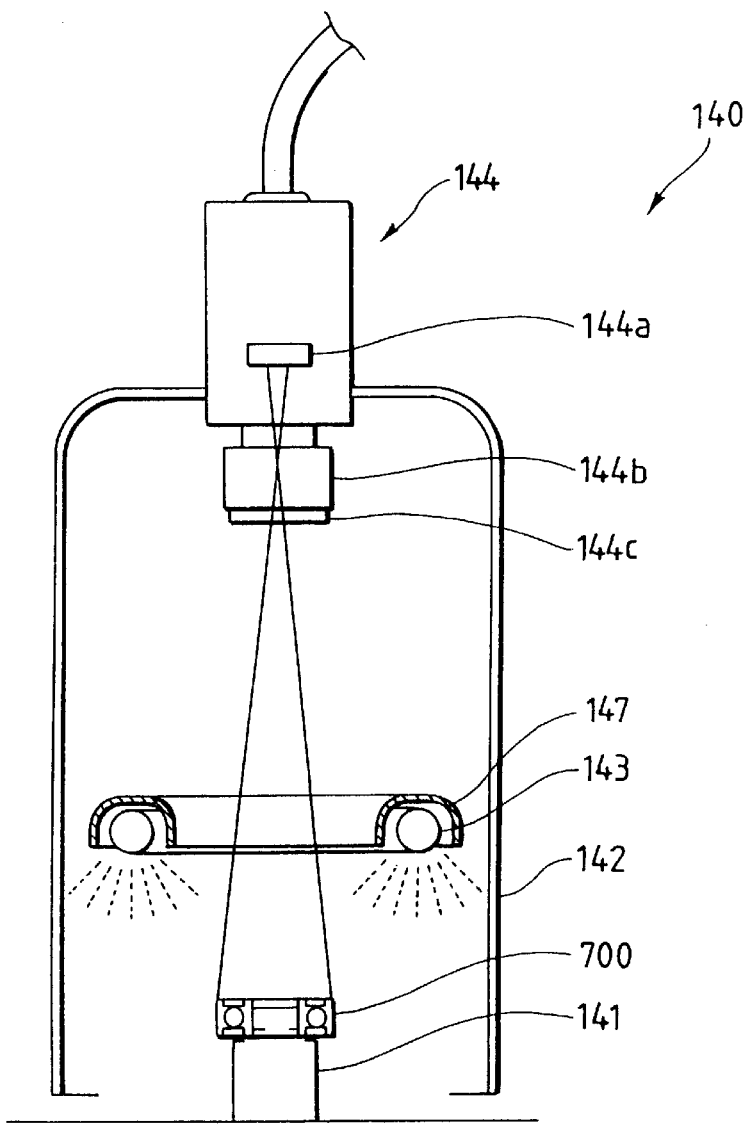
FIG. 13 is a diagram showing the construction of a lubricant applied condition inspecting apparatus according to a seventh embodiment of the present invention.
Figure 14:
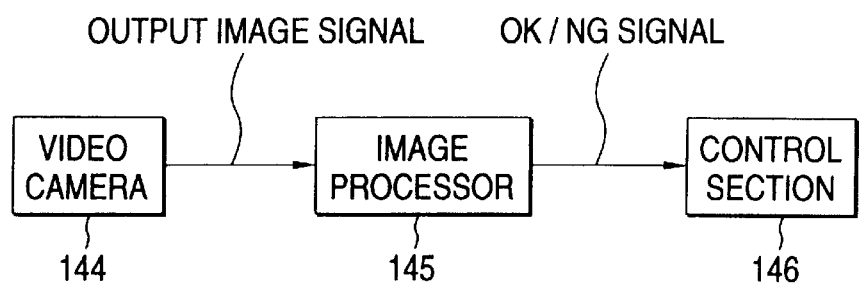
FIG. 14 is a block diagram showing a flow of signals for inspecting a lubricant applied condition according to the seventh embodiment.
Figure 15:
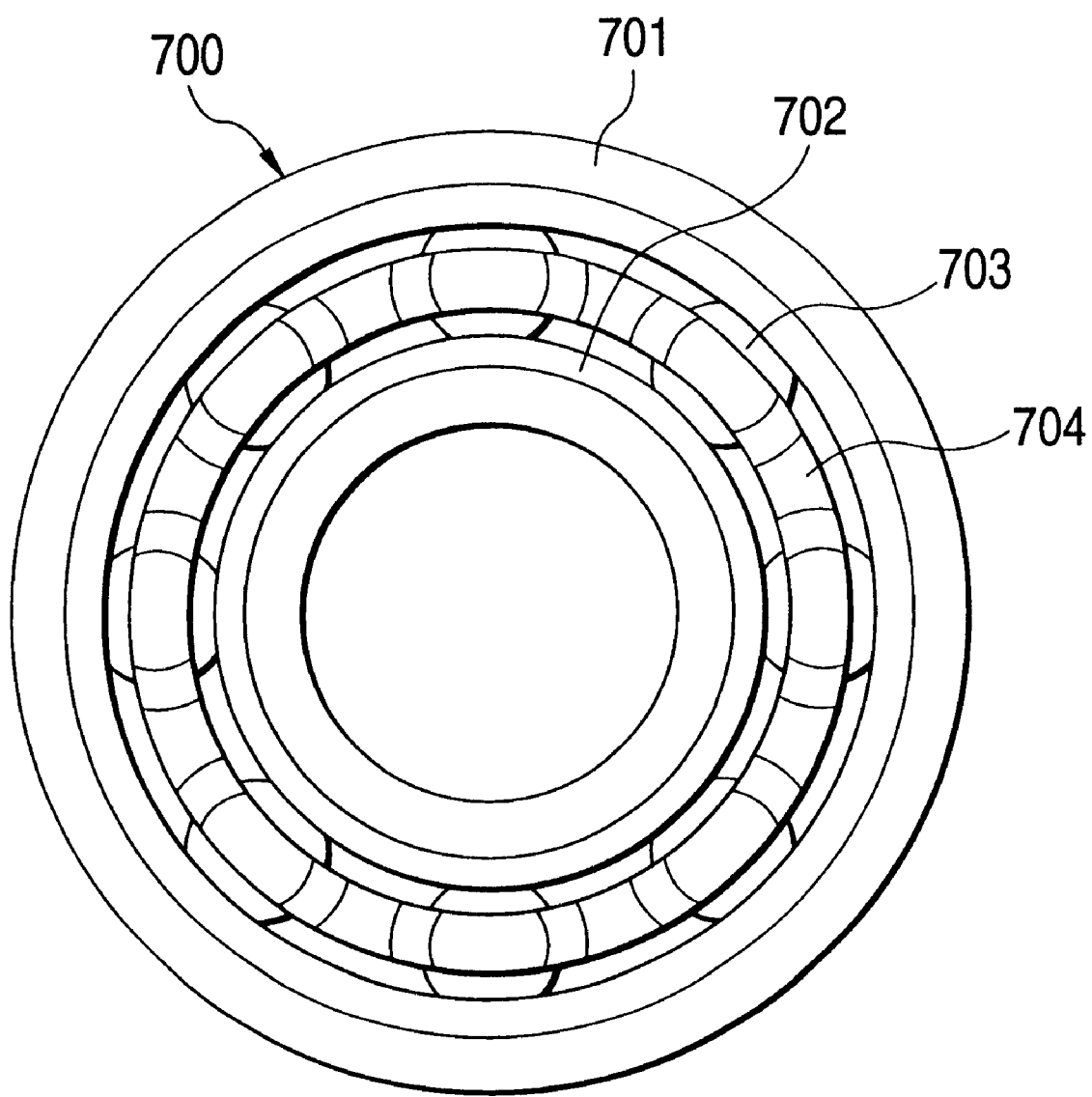
FIG. 15 is a plan view showing the construction of a rolling bearing.

FIG. 13 shows the construction of a lubricant applied condition inspecting apparatus according to this embodiment, and FIG. 14 is a block diagram showing a flow of signals for inspecting the lubricant applied condition.

In this embodiment, an amine antioxidant is added into the lubricant which is excited with an ultraviolet ray so as to emit fluorescence. With the rolling bearing applied with such a lubricant, since the surface applied with the lubricant emits fluorescence when irradiated with an ultraviolet ray, defective or non-defective with-respect to the application of the lubricant can be judged by seeing whether or not the fluorescence is emitted from the surface. As the amine antioxidant for use in this embodiment, for instance, IRGANOX L06 produced by Chiba Specialty Chemicals (Inc) may be used.

Next, the construction of a lubricant applied condition inspecting apparatus 140 will be described below. This lubricant applied condition inspecting apparatus includes a placing table 141 for securing the rolling bearing 700 to which the lubricant is applied, a light shielding hood 142 for preventing the rolling bearing 700 on the placing table 141 from being exposed to external visible light, a black light blue fluorescent lamp 143 provided inside the light shielding hood 142 for irradiating a near ultraviolet ray to the rolling bearing 700 and a video camera 144 for picking up an image of the rolling bearing 700 to which the near ultraviolet ray is irradiated. Image data so picked up are constructed so as to be then inputted into a control section 146 via an image processor 145 as shown in FIG. 14.

The black light blue fluorescent lamp 143 is a fluorescent lamp in which a near ultraviolet irradiating fluorescent substance is coated inside a glass tube using a dark blue special filter which allows the near ultraviolet ray to transmit therethrough in an efficient fashion, and the fluorescent lamp emits a near ultraviolet ray of a wave length ranging 300 nm to 400 nm (with a peak wave length of 370 nm).

The black light blue fluorescent lamp 143 is formed in an annular shape and an upper portion thereof is covered with a lamp cover 147 having a reflection film formed on an internal surface thereof. The video camera 144 has an image picking up device 144a such as a CCD, a condensing lens 144b and a infrared ray cut-off filter 144c for cutting off noise.

Next, a method for inspecting a lubricant condition according to this embodiment will be described below.

The rolling bearing 700 to which the lubricant is applied is placed on the placing table 141, and the black light blue fluorescent lamp 143 is turned on so as to irradiate the near ultraviolet ray to the rolling bearing 700. Then, an image of the rolling bearing 700 irradiated with the near ultraviolet ray is picked up by the video camera 144. Since the lubricant emits fluorescence when the ultraviolet ray is received thereby, the image so picked up then is reflected as white on the surface over which the lubricant is applied, while portions to which the lubricant is not applied do not emit any fluorescence and hence they are reflected as black on the picked up image. An image signal from the picked up image is then inputted into the image processor 145 shown in FIG. 14.

In the image processor 145, the image signal so inputted is then binarization processed so that only white portions reflected by the fluorescence can be extracted. Then, the total surface area of the white portion is calculated and the calculated total surface area is then compared with data on the area of the white portions set in advance. As the results of the comparison, if the calculated total surface area is equal to or larger than the set value, the lubricant applied condition is judged as being good, and on the contrary, when it smaller than the set value, the condition is judged as being not good. The result of a judgement on OK or NG is outputted as a signal to the control section 146 connected to the image processor 145.

The control section 146 controls such that the rolling bearing 700 is transferred to a post process when an OK signal is inputted, while when an NG signal is inputted, then the control section 146 controls such that the rolling bearing 700 is discharged as a defective and generates an alarm.

If the black light blue fluorescent lamp 143 is kept turned on while the application of lubricant is being detected, the temperature of the lamp 143 is increased and eventually emits infrared rays. When the infrared ray so generated is reflected on the rolling bearing and enters the CCD 144a, electric charge is accumulated in the CCD 144a and it appears in an output image signal Va as noise. To cope with this, in the present embodiment, an infrared ray cut-off filter 144c is provided on the video camera 144 so as to remove infrared rays. According to this construction, there is no risk of noise appearing in the output image signal Va even if the detection of the application of lubricant is repeatedly performed, thereby making it possible to perform accurate lubricant application detection in succession.

Since the lubricant applied condition detecting device 40 according to the present embodiment can be incorporated in an automatic machine for applying a lubricant to the rolling bearing 700, it is possible to inspect in line lubricant applied conditions of the total number of rolling bearings. Then, in a case where no application of lubricant is carried out for some reason or where there is happening a failure of application of lubricant, the rolling bearing under inspection is discharged from the aforesaid inspection line based on an NG signal from the application detecting device 140, or the machine is automatically temporarily stopped, whereby the rolling bearing judged as defective is prevented from being transferred to a post process. Consequently, mixing of a defective into rolling bearing products can be prevented, whereby rolling bearings with high quality can be produced.

According to the present invention, as has been described heretofore, since lubricant can be applied easily and securely only to portions such as the rolling elements inside the rolling bearing and the raceway surfaces which actually need lubrication, the lubricant does not adhere to portions other than those which actually need lubrication such as the external side of the rolling bearing. Therefore, a required volume of lubricant is secured in the interior of the rolling bearing, whereas the external side of the rolling bearing is left sufficiently dry. Thus, this lubricant application are optimally suitable for use for an appartus such as a hard disk drive needing a high degree of cleanness in the interior thereof, and there is also provided an advantage in which a rolling bearing can be produced at low costs which can reduce the torque and perform stabilization thereof.

Furthermore, there is provided an advantage in which a volume of lubricant to be applied to the rolling elements inside the rolling bearing can be controlled in an accurate fashion.

In addition, according to the method and apparatus for inspecting a lubricant applied condition of a rolling bearing according to the present invention, the laser beam is irradiated toward between the discharge port of the lubricant discharge device and the rolling bearing, and the reflected laser beam reflected by the lubricant when it is discharged from the discharge port is received by the photoreceptor device disposed on the optical axis of the reflected laser beam, whereby whether or not the lubricant is applied to the rolling bearing is inspected based on the output from the photoreceptor device. This prevents a rolling bearing from failing to be properly applied with the lubricant from being transferred to a post process, whereby not only can the reliability of the rolling bearing itself be improved but also the reliability of equipment using that rolling bearing can be prevented from being deteriorated.

While only certain embodiments of the invention have been specifically described herein, it will apparent that numerous modification may be made thereto without departing from the spirit and scope of the invention.

The present disclosure relates to the subject matter contained in Japanese patent application Nos. Hei. 10-370097 filed on Dec. 25, 1999 and Hei. 11-161260 filed on Jun. 8, 1999 which are expressly incorporated herein by reference in its entirety.

What is claimed is:

1. An inspecting apparatus of a lubricant applied condition of a rolling bearing, which inspects whether or not a prescribed amount of lubricant is discharged from a lubricant application device that injects said lubricant into the interior of said rolling bearing, comprising:

a projective element for irradiating an illuminant light to an interior of said rolling bearing, wherein said lubricant is discharged from a discharge port of said lubricant application device;

a photoreceptive element for receiving a reflected light reflected from the interior of said rolling bearing; and a determining means for determining whether or not said lubricant is applied to said rolling bearing based on an output from said photoreceptive element, wherein the inspecting apparatus is capable of inspecting the lubricant applied condition of the interior of said rolling bearing when said rolling bearing is substantially stopped.

2. An inspecting apparatus according to claim 1, wherein said projective element irradiates a laser beam to said lubricant position of said rolling bearing, and said photoreceptive element is located on an optical axis of the reflected laser beam that is reflected by said lubricant when said lubricant is discharged from said discharge port.

3. An inspecting apparatus according to claim 1, wherein said projective element is a laser beam incoming with an incident angle not more than 30° with respect to a plane perpendicular to a center axis of the rolling bearing.

4. An inspecting apparatus according to claim 1, wherein said rolling bearing comprises a plurality of balls and a snap cage, the lubricant is discharged on said balls of said rolling bearing, and the illuminant light is irradiated to said balls discharged with the lubricant when the roller bearing is substantially stopped.

5. An inspecting apparatus according to claim 1, wherein said lubricant is an oil droplet being discharged to the interior of said rolling bearing, and the projective element irradiates the illuminant light to the oil droplet.

6. An inspecting apparatus according to claim 5, wherein said oil droplet is discharged to a surface of a rolling element disposed in the interior of said rolling bearing, and the inspecting apparatus is capable of inspecting the oil droplet in the interior of said rolling bearing.

7. In inspecting method of a lubricant applied condition of a rolling bearing, which inspects whether or not a prescribed amount of lubricant is discharged from a lubricant application device that injects said lubricant into the interior of said rolling bearing, comprising the steps of:

irradiating an illuminant light to the interior of said rolling bearing said lubricant, wherein said lubricant is discharged from a discharge port of said lubricant application device;

receiving a reflected light reflected from the lubricant in the interior of said rolling bearing when said lubricant is disposed in the interior of said rolling bearing; and determining whether or not said lubricant is applied to said rolling bearing based on an output of the reflected light, wherein the inspecting apparatus is capable of inspecting the lubricating condition of the interior of said rolling bearing when said rolling bearing is substantially stopped.

8. An inspecting method according to claim 7, wherein said rolling bearing comprises a plurality of balls and a snap cage, the lubricant is discharged on said balls of said rolling bearing, and the illuminant light is irradiated to said balls discharged with the lubricant when the roller bearing is substantially stopped.

9. An inspecting method according to claim 7, wherein said lubricant is an oil droplet being discharged to the interior of said rolling bearing, and the projective element irradiates the illuminant light to the oil droplet.

10. An inspecting method according to claim 9, wherein said oil droplet is discharged to a surface of a rolling element disposed in the interior of said rolling bearing, and the inspecting apparatus is capable of inspecting the oil droplet in the interior of said rolling bearing.

* * * * *